(12) United States Patent
Guo et al.

(10) Patent No.: US 10,554,356 B2
(45) Date of Patent: Feb. 4, 2020

(54) HYBRID AUTOMATIC REPEAT REQUEST (HARQ) INFORMATION TRANSMISSION METHOD AND APPARATUS

(71) Applicant: Huawei Technologies Co., Ltd., Shenzhen (CN)

(72) Inventors: Wenting Guo, Shanghai (CN); Lei Lu, Shanghai (CN); Dai Shi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 106 days.

(21) Appl. No.: 15/709,019

(22) Filed: Sep. 19, 2017

(65) Prior Publication Data

US 2018/0006786 A1 Jan. 4, 2018

Related U.S. Application Data

(63) Continuation of application No. PCT/CN2015/074622, filed on Mar. 19, 2015.

(51) Int. Cl.
*H04W 4/00* (2018.01)
*H04L 5/00* (2006.01)
(Continued)

(52) U.S. Cl.
CPC .......... *H04L 5/0048* (2013.01); *H04L 1/1812* (2013.01); *H04W 88/02* (2013.01)

(58) Field of Classification Search
CPC ....... H04L 1/18; H04L 5/0048; H04L 1/1812; H04L 5/0094; H04L 5/0055; H04L 5/0051
See application file for complete search history.

(56) References Cited

U.S. PATENT DOCUMENTS

| 2007/0189207 | A1 | 8/2007 | Sammour et al. |
| 2007/0195809 | A1* | 8/2007 | Blanz .................... H04L 1/0025 370/426 |

(Continued)

FOREIGN PATENT DOCUMENTS

| CN | 102404096 A | 4/2012 |
| CN | 102647248 A | 8/2012 |

(Continued)

OTHER PUBLICATIONS

Au et al., "Uplink Contention Based SCMA for 5G Radio Access," Globecom 2014 Workshop, Emerging Technologies for 5G Wireless Cellular Networks, pp. 900-905, Institute of Electrical and Electronics Engineers, New York, New York (2014).

(Continued)

*Primary Examiner* — Abdelnabi O Musa
(74) *Attorney, Agent, or Firm* — Leydig, Voit & Mayer, Ltd.

(57) ABSTRACT

An information transmission method includes: modulating, by a terminal device, encoded hybrid automatic repeat request (HARQ) information according to a codebook, to generate HARQ modulation symbols, where the HARQ modulation symbols include at least one non-zero HARQ modulation symbol and at least one zero HARQ modulation symbol, the codebook includes at least two code words, the code words are multi-dimensional complex vectors, and the code words are used to indicate a mapping relationship between a bit and at least two modulation symbols; and sending the HARQ modulation symbols to a network device.

14 Claims, 8 Drawing Sheets

(51) Int. Cl.
  *H04L 1/18*    (2006.01)
  *H04W 88/02*   (2009.01)

(56) References Cited

U.S. PATENT DOCUMENTS

| | | |
|---|---|---|
| 2012/0207111 A1 | 8/2012 | Jang et al. |
| 2013/0188590 A1 | 7/2013 | Aiba et al. |
| 2013/0195065 A1 | 8/2013 | Park |
| 2014/0140360 A1 | 5/2014 | Nikopour et al. |
| 2015/0208366 A1* | 7/2015 | Papasakellariou ............ H04W 74/0833 370/311 |
| 2015/0223236 A1* | 8/2015 | Ko .................. H04L 1/1607 370/280 |
| 2016/0080129 A1 | 3/2016 | Jang et al. |
| 2016/0278048 A1* | 9/2016 | Nory .................. H04W 16/14 |
| 2017/0048049 A1 | 2/2017 | Park et al. |

FOREIGN PATENT DOCUMENTS

| | | |
|---|---|---|
| CN | 102714580 A | 10/2012 |
| CN | 103141146 A | 6/2013 |
| CN | 103181109 A | 6/2013 |
| CN | 103516487 A | 1/2014 |

OTHER PUBLICATIONS

"3rd Generation Partnership Project; Technical Specification Group Radio Access Network; Evolved Universal Terrestrial Radio Access (E-UTRA); Multiplexing and channel coding (Release 9)," 3GPP TS 36.212 V9.2.0, 3rd Generation Partnership Project, Valbonne, France (Jun. 2010).

"3rd Generation Partnership Project; Technical Specification Group Radio Access Network; Evolved Universal Terrestrial Radio Access (E-UTRA); Multiplexing and channel coding (Release 12)," 3GPP TS 36.212 V12.4.0, 3rd Generation Partnership Project, Valbonne, France (Mar. 2015).

* cited by examiner

HYBRID AUTOMATIC REPEAT REQUEST (HARQ) INFORMATION TRANSMISSION METHOD AND APPARATUS

CROSS-REFERENCE TO RELATED APPLICATIONS

This application is a continuation of International Application No. PCT/CN2015/074622, filed on Mar. 19, 2015, the disclosure of which is hereby incorporated by reference in its entirety.

TECHNICAL FIELD

The present invention relates to the field of wireless communications technologies, and specifically, to an information transmission method, a terminal device, a network device, and an apparatus.

BACKGROUND

A sparse non-orthogonal multiple access manner is a new multiple access manner. In this access manner, multiple users use a same time-frequency resource block. Each resource block includes several resource elements (RE). The resource elements may be subcarrier-symbol units in an orthogonal frequency division multiplexing (OFDM) technology, or may be time-domain or frequency-domain resource elements in another air-interface technology.

A sparse non-orthogonal multiple access system is similar to an OFDM system, and only a modulation encoder and a modulation decoder in the OFDM system are replaced with an encoder and a decoder corresponding to sparse non-orthogonal multiple access. In a Long Term Evolution (LTE) system, if decoding fails at a decode end, decoding error data is sent again by using a hybrid automatic repeat request (HARQ) system. The HARQ system is a system obtained after forward error correction (FEC) is introduced into an automatic repeat request system. FEC may be used for correcting a data error in a transmission process. If the data error is in an error-correction range of FEC, the error is corrected by using FEC, and the decode end feeds back hybrid automatic repeat request acknowledgement (HARQ-ACK, HARQ Acknowledgement) information to a transmit end. If the data error goes beyond an error-correction range of FEC, the decode end feeds back hybrid automatic repeat request negative acknowledgement (HARQ-NACK, HARQ Negative Acknowledgement) information to a transmit end. The HARQ-ACK and the HARQ-NACK are collectively referred to as HARQ information.

In an existing LTE system, on a physical uplink shared channel (PUSCH), user equipment implements multiplexing of HARQ information and uplink transmission data in a frequency band of the user equipment. This HARQ information transmission method is applicable to a system without frequency domain multiplexing. However, for some systems such as a sparse code multiple access (SCMA) system, multiple users multiplex a frequency domain resource in this system. If HARQ information is transmitted by using the method in the LTE system, HARQ information of users may be overlapped, and therefore, a base station cannot perform decoding by using the decoding method in LTE. Therefore, for a system in which multiple users multiplex a frequency domain resource, the existing method for transmitting HARQ information on a PUSCH channel is no longer applicable.

SUMMARY

Embodiments of the present invention provide an information transmission method, a terminal device, a network device, and an apparatus, so that HARQ information can be transmitted on a PUSCH channel in a system in which multiple users multiplex a frequency domain resource.

According to a first aspect, an information transmission method is provided, where the method includes: modulating, by a terminal device, encoded hybrid automatic repeat request (HARQ) information according to a codebook, to generate HARQ modulation symbols, where the HARQ modulation symbols include at least one non-zero HARQ modulation symbol and at least one zero HARQ modulation symbol, the codebook includes at least two code words, the code words are multi-dimensional complex vectors, and the code words are used to indicate a mapping relationship between the encoded HARQ information and at least two modulation symbols; and sending the HARQ modulation symbols to a network device.

With reference to the first aspect, in a first possible implementation manner of the first aspect, the HARQ modulation symbols are mapped to one side or two sides of a modulation symbol of a demodulation reference signal (DMRS).

With reference to the first aspect or the first possible implementation manner of the first aspect, in a second possible implementation manner of the first aspect, if a modulation order is K, a length of the encoded HARQ information is N×K, K is an integer multiple of 2, and N is a positive integer greater than 0.

With reference to the second possible implementation manner of the first aspect, in a third possible implementation manner of the first aspect, if a length of HARQ information before encoding is 1 bit, N is equal to 2.

With reference to the second possible implementation manner of the first aspect, in a fourth possible implementation manner of the first aspect, if a length of HARQ information before encoding is 2 bits, N is equal to 6.

According to a second aspect, an information transmission method is provided, where the method includes: modulating, by a terminal device, encoded hybrid automatic repeat request (HARQ) information, to generate a HARQ modulation symbol; receiving, by the terminal device, mapping resource indication information, where the mapping resource indication information is used to indicate information about a mapping resource allocated to the terminal device for mapping the HARQ modulation symbol; and performing, by the terminal device, resource mapping on the HARQ modulation symbol according to the mapping resource indication information.

With reference to the second aspect, in a first possible implementation manner of the second aspect, the HARQ modulation symbol is mapped to one side or two sides of a modulation symbol of a demodulation reference signal (DMRS).

With reference to the second aspect or the first possible implementation manner of the second aspect, in a second possible implementation manner of the second aspect, the mapping resource indication information includes identifiers of at least two terminal devices and a quantity of bits of to-be-sent HARQ information of each terminal device in the at least two terminal devices that is to send the HARQ information, the at least two terminal devices include the terminal device, and the at least two terminal devices transmit data by using a same time-frequency resource.

With reference to the second aspect or the first possible implementation manner of the second aspect, in a third possible implementation manner of the second aspect, the mapping resource indication information includes information about a start location of a subcarrier allocated to each terminal device in at least two terminal devices for sending HARQ information, and a quantity of bits of to-be-sent HARQ information of each terminal device in the at least two terminal devices that is to send the HARQ information, the at least two terminal devices include the terminal device, and the at least two terminal devices transmit data by using a same time-frequency resource.

With reference to the second aspect or the first possible implementation manner of the second aspect, in a fourth possible implementation manner of the second aspect, the mapping resource indication information includes identifiers of at least two terminal devices, information about a quantity of the at least two terminal devices, and a quantity of bits of a to-be-sent HARQ signal of each terminal device in the at least two terminal devices that is to send the HARQ information, the at least two terminal devices include the terminal device, and the at least two terminal devices transmit data by using a same time-frequency resource.

With reference to any one of the second to the fourth possible implementation manners of the second aspect, in a fifth possible implementation manner of the second aspect, the method further includes: sending, by the terminal device, data, where the sent data is sent on a resource element other than resource elements allocated to the at least two terminal devices for sending HARQ information.

According to a third aspect, an information transmission method is provided, where the method includes: sending, by a network device, mapping resource indication information, where the mapping resource indication information is used to indicate information about a mapping resource allocated to a terminal device for mapping a HARQ modulation symbol; and receiving, by the network device, the HARQ modulation symbol on which the terminal device performed resource mapping according to the mapping resource indication information.

With reference to the third aspect, in a first possible implementation manner of the third aspect, the HARQ modulation symbol is mapped to one side or two sides of a modulation symbol of a demodulation reference signal (DMRS).

With reference to the third aspect or the first possible implementation manner of the third aspect, in a second possible implementation manner of the third aspect, the mapping resource indication information includes identifiers of at least two terminal devices and a quantity of bits of to-be-sent HARQ information of each terminal device in the at least two terminal devices that is to send the HARQ information, the at least two terminal devices include the terminal device, and the at least two terminal devices transmit data by using a same time-frequency resource.

With reference to the third aspect or the first possible implementation manner of the third aspect, in a third possible implementation manner of the third aspect, the mapping resource indication information includes information about a start location of a subcarrier allocated to each terminal device in at least two terminal devices for sending HARQ information, and a quantity of bits of to-be-sent HARQ information of each terminal device in the at least two terminal devices that is to send the HARQ information, the at least two terminal devices include the terminal device, and the at least two terminal devices transmit data by using a same time-frequency resource.

With reference to the third aspect or the first possible implementation manner of the third aspect, in a fourth possible implementation manner of the third aspect, the mapping resource indication information includes identifiers of at least two terminal devices, information about a quantity of the at least two terminal devices, and a quantity of bits of a to-be-sent HARQ signal of each terminal device in the at least two terminal devices that is to send the HARQ information, the at least two terminal devices include the terminal device, and the at least two terminal devices transmit data by using a same time-frequency resource.

With reference to any one of the second to the fourth possible implementation manners of the third aspect, in a fifth possible implementation manner of the third aspect, the method further includes: receiving, by the network device, data sent by the terminal device, where the sent data is sent on a resource element other than resource elements allocated to the at least two terminal devices for sending HARQ information.

According to a fourth aspect, a terminal device is provided, including: a modulation unit, configured to modulate encoded hybrid automatic repeat request (HARQ) information according to a codebook, to generate HARQ modulation symbols, where the HARQ modulation symbols include at least one non-zero HARQ modulation symbol and at least one zero HARQ modulation symbol, the codebook includes at least two code words, the code words are multi-dimensional complex vectors, and the code words are used to indicate a mapping relationship between the encoded HARQ information and at least two modulation symbols; and a sending unit, configured to send the HARQ modulation symbols to a network device.

With reference to the fourth aspect, in a first possible implementation manner of the fourth aspect, the HARQ modulation symbols generated by the modulation unit are mapped to one side or two sides of a modulation symbol of a demodulation reference signal (DMRS).

With reference to the fourth aspect or the first possible implementation manner of the fourth aspect, in a second possible implementation manner of the fourth aspect, if a modulation order is K, a length of the encoded HARQ information is N×K, K is an integer multiple of 2, and N is a positive integer greater than 0.

With reference to the second possible implementation manner of the fourth aspect, in a third possible implementation manner of the fourth aspect, if a length of HARQ information before encoding is 1 bit, N is equal to 2.

With reference to the second possible implementation manner of the fourth aspect, in a fourth possible implementation manner of the fourth aspect, if a length of HARQ information before encoding is 2 bits, N is equal to 6.

According to a fifth aspect, a terminal device is provided, including: a modulation unit, configured to modulate encoded hybrid automatic repeat request (HARQ) information, to generate a HARQ modulation symbol; a receiving unit, configured to receive mapping resource indication information, where the mapping resource indication information is used to indicate information about a mapping resource allocated to the terminal device for mapping the HARQ modulation symbol; and a mapping unit, configured to perform resource mapping on the HARQ modulation symbol according to the mapping resource indication information.

With reference to the fifth aspect, in a first possible implementation manner of the fifth aspect, the HARQ modulation symbol generated by the modulation unit is mapped to one side or two sides of a modulation symbol of a demodulation reference signal (DMRS).

With reference to the fifth aspect or the first possible implementation manner of the fifth aspect, in a second possible implementation manner of the fifth aspect, the mapping resource indication information received by the receiving unit includes identifiers of at least two terminal devices and a quantity of bits of to-be-sent HARQ information of each terminal device in the at least two terminal devices that is to send the HARQ information, the at least two terminal devices include the terminal device, and the at least two terminal devices transmit data by using a same time-frequency resource.

With reference to the fifth aspect or the first possible implementation manner of the fifth aspect, in a third possible implementation manner of the fifth aspect, the mapping resource indication information received by the receiving unit includes information about a start location of a subcarrier allocated to each terminal device in at least two terminal devices for sending HARQ information, and a quantity of bits of to-be-sent HARQ information of each terminal device in the at least two terminal devices that is to send the HARQ information, the at least two terminal devices include the terminal device, and the at least two terminal devices transmit data by using a same time-frequency resource.

With reference to the fifth aspect or the first possible implementation manner of the fifth aspect, in a fourth possible implementation manner of the fifth aspect, the mapping resource indication information received by the receiving unit includes identifiers of at least two terminal devices, information about a quantity of the at least two terminal devices, and a quantity of bits of a to-be-sent HARQ signal of each terminal device in the at least two terminal devices that is to send the HARQ information, the at least two terminal devices include the terminal device, and the at least two terminal devices transmit data by using a same time-frequency resource.

With reference to any one of the second to the fourth possible implementation manners of the fifth aspect, in a fifth possible implementation manner of the fifth aspect, the terminal device further includes: a sending unit, configured to send data, where the sent data is sent on a resource element other than resource elements allocated to the at least two terminal devices for sending HARQ information.

According to a sixth aspect, a network device is provided, including: a sending unit, configured to send mapping resource indication information, where the mapping resource indication information is used to indicate information about a mapping resource allocated to a terminal device for mapping a hybrid automatic repeat request (HARQ) modulation symbol; and a receiving unit, configured to receive the HARQ modulation symbol on which the terminal device performed resource mapping according to the mapping resource indication information.

With reference to the sixth aspect, in a first possible implementation manner of the sixth aspect, the HARQ modulation symbol is mapped to one side or two sides of a modulation symbol of a demodulation reference signal (DMRS).

With reference to the sixth aspect or the first possible implementation manner of the sixth aspect, in a second possible implementation manner of the sixth aspect, the mapping resource indication information sent by the sending unit includes identifiers of at least two terminal devices and a quantity of bits of to-be-sent HARQ information of each terminal device in the at least two terminal devices that is to send the HARQ information, the at least two terminal devices include the terminal device, and the at least two terminal devices transmit data by using a same time-frequency resource.

With reference to the sixth aspect or the first possible implementation manner of the sixth aspect, in a third possible implementation manner of the sixth aspect, the mapping resource indication information sent by the sending unit includes information about a start location of a subcarrier allocated to each terminal device in at least two terminal devices for sending HARQ information, and a quantity of bits of to-be-sent HARQ information of each terminal device in the at least two terminal devices that is to send the HARQ information, the at least two terminal devices include the terminal device, and the at least two terminal devices transmit data by using a same time-frequency resource.

With reference to the sixth aspect or the first possible implementation manner of the sixth aspect, in a fourth possible implementation manner of the sixth aspect, the mapping resource indication information sent by the sending unit includes identifiers of at least two terminal devices, information about a quantity of the at least two terminal devices, and a quantity of bits of a to-be-sent HARQ signal of each terminal device in the at least two terminal devices that is to send the HARQ information, the at least two terminal devices include the terminal device, and the at least two terminal devices transmit data by using a same time-frequency resource.

With reference to any one of the second to the fourth possible implementation manners of the sixth aspect, in a fifth possible implementation manner of the sixth aspect, the receiving unit is further configured to receive data sent by the terminal device, and the sent data is sent on a resource element other than resource elements allocated to the at least two terminal devices for sending HARQ information.

According to a seventh aspect, an apparatus is provided, including: a bus, a processor connected to the bus, and a memory connected to the bus; where the processor invokes, by using the bus, a program stored in the memory, to modulate encoded hybrid automatic repeat request (HARQ) information according to a codebook, to generate HARQ modulation symbols, where the HARQ modulation symbols include at least one non-zero HARQ modulation symbol and at least one zero HARQ modulation symbol, the codebook includes at least two code words, the code words are multi-dimensional complex vectors, and the code words are used to indicate a mapping relationship between the encoded HARQ information and at least two modulation symbols; and to send the HARQ modulation symbols to a network device.

With reference to the seventh aspect, in a first possible implementation manner of the seventh aspect, the HARQ modulation symbols are mapped to one side or two sides of a modulation symbol of a demodulation reference signal (DMRS).

With reference to the seventh aspect or the first possible implementation manner of the seventh aspect, in a second possible implementation manner of the seventh aspect, if a modulation order is K, a length of the encoded HARQ information is N×K, K is an integer multiple of 2, and N is a positive integer greater than 0.

With reference to the second possible implementation manner of the seventh aspect, in a third possible implementation manner of the seventh aspect, if a length of HARQ information before encoding is 1 bit, N is equal to 2.

With reference to the second possible implementation manner of the seventh aspect, in a fourth possible implementation manner of the seventh aspect, if a length of HARQ information before encoding is 2 bits, N is equal to 6.

According to an eighth aspect, an apparatus is provided, including: a bus, a processor connected to the bus, and a memory connected to the bus; where the processor invokes, by using the bus, a program stored in the memory, to modulate encoded hybrid automatic repeat request (HARQ) information, to generate a HARQ modulation symbol; to receive mapping resource indication information, where the mapping resource indication information is used to indicate information about a mapping resource allocated to the terminal device for mapping the HARQ modulation symbol; and to perform resource mapping on the HARQ modulation symbol according to the mapping resource indication information.

With reference to the eighth aspect, in a first possible implementation manner of the eighth aspect, the HARQ modulation symbol is mapped to one side or two sides of a modulation symbol of a demodulation reference signal (DMRS).

With reference to the eighth aspect or the first possible implementation manner of the eighth aspect, in a second possible implementation manner of the eighth aspect, the mapping resource indication information includes identifiers of at least two terminal devices and a quantity of bits of to-be-sent HARQ information of each terminal device in the at least two terminal devices that is to send the HARQ information, the at least two terminal devices include the terminal device, and the at least two terminal devices transmit data by using a same time-frequency resource.

With reference to the eighth aspect or the first possible implementation manner of the eighth aspect, in a third possible implementation manner of the eighth aspect, the mapping resource indication information includes information about a start location of a subcarrier allocated to each terminal device in at least two terminal devices for sending HARQ information, and a quantity of bits of to-be-sent HARQ information of each terminal device in the at least two terminal devices that is to send the HARQ information, the at least two terminal devices include the terminal device, and the at least two terminal devices transmit data by using a same time-frequency resource.

With reference to the eighth aspect or the first possible implementation manner of the eighth aspect, in a fourth possible implementation manner of the eighth aspect, the mapping resource indication information includes identifiers of at least two terminal devices, information about a quantity of the at least two terminal devices, and a quantity of bits of a to-be-sent HARQ signal of each terminal device in the at least two terminal devices that is to send the HARQ information, the at least two terminal devices include the terminal device, and the at least two terminal devices transmit data by using a same time-frequency resource.

With reference to any one of the second to the fourth possible implementation manners of the eighth aspect, in a fifth possible implementation manner of the eighth aspect, the processor is further configured to send data, and the sent data is sent on a resource element other than resource elements allocated to the at least two terminal devices for sending HARQ information.

According to a ninth aspect, an apparatus is provided, including: a bus, a processor connected to the bus, and a memory connected to the bus; where the processor invokes, by using the bus, a program stored in the memory, to send mapping resource indication information, where the mapping resource indication information is used to indicate information about a mapping resource allocated to a terminal device for mapping a hybrid automatic repeat request (HARQ) modulation symbol; and to receive the HARQ modulation symbol on which the terminal device performed resource mapping according to the mapping resource indication information.

With reference to the ninth aspect, in a first possible implementation manner of the ninth aspect, the HARQ modulation symbol is mapped to one side or two sides of a modulation symbol of a demodulation reference signal (DMRS).

With reference to the ninth aspect or the first possible implementation manner of the ninth aspect, in a second possible implementation manner of the ninth aspect, the mapping resource indication information includes identifiers of at least two terminal devices and a quantity of bits of to-be-sent HARQ information of each terminal device in the at least two terminal devices that is to send the HARQ information, the at least two terminal devices include the terminal device, and the at least two terminal devices transmit data by using a same time-frequency resource.

With reference to the ninth aspect or the first possible implementation manner of the ninth aspect, in a third possible implementation manner of the ninth aspect, the mapping resource indication information includes information about a start location of a subcarrier allocated to each terminal device in at least two terminal devices for sending HARQ information, and a quantity of bits of to-be-sent HARQ information of each terminal device in the at least two terminal devices that is to send the HARQ information, the at least two terminal devices include the terminal device, and the at least two terminal devices transmit data by using a same time-frequency resource.

With reference to the ninth aspect or the first possible implementation manner of the ninth aspect, in a fourth possible implementation manner of the ninth aspect, the mapping resource indication information includes identifiers of at least two terminal devices, information about a quantity of the at least two terminal devices, and a quantity of bits of a to-be-sent HARQ signal of each terminal device in the at least two terminal devices that is to send the HARQ information, the at least two terminal devices include the terminal device, and the at least two terminal devices transmit data by using a same time-frequency resource.

With reference to any one of the second to the fourth possible implementation manners of the ninth aspect, in a fifth possible implementation manner of the ninth aspect, the processor is further configured to receive data sent by the terminal device, and the sent data is sent on a resource element other than resource elements allocated to the at least two terminal devices for sending HARQ information.

In embodiments of the present invention, encoded HARQ information is modulated according to a codebook, so that when multiple terminal devices transmit HARQ information by using a same time-frequency resource, correct decoding can be performed on a network device side. Therefore, in embodiments of the present invention, HARQ information can be transmitted in a system in which multiple terminal devices use a same time-frequency resource, thereby improving reliability of information transmission.

BRIEF DESCRIPTION OF DRAWINGS

To describe technical solutions in embodiments of the present invention more clearly, the following briefly describes the accompanying drawings for describing the embodiments of the present invention. The accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
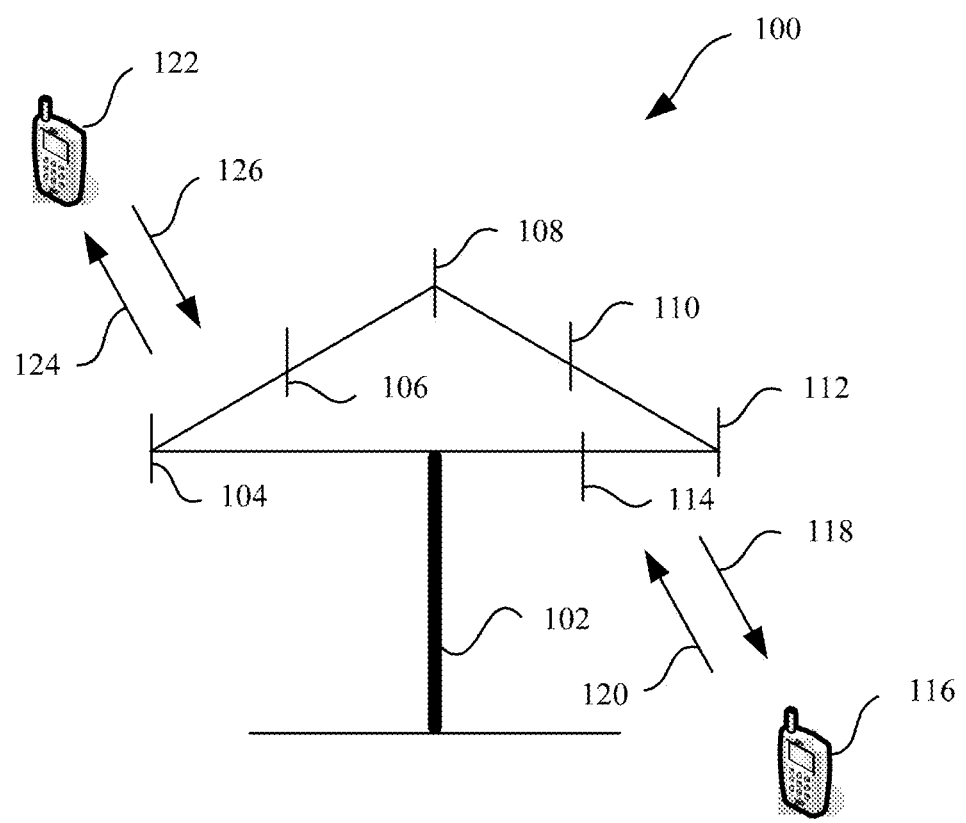
FIG. 1 is a schematic diagram of a communications system of an information transmission method according to the present invention.

The following clearly describes technical solutions in embodiments of the present invention with reference to the accompanying drawings. The described embodiments are a part rather than all of the embodiments of the present invention. All other embodiments obtained by a person of ordinary skill in the art based on the embodiments of the present invention without creative efforts shall fall within the protection scope of the present invention.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

The present invention describes various embodiments with reference to a terminal device. The terminal device may be referred to as user equipment (UE) user equipment, an access terminal, a subscriber unit, a subscriber station, a mobile station, a mobile station, a remote station, a remote terminal, a mobile device, a user terminal, a terminal, a wireless communications device, a user agent, or a user apparatus. The access terminal may be a cellular phone, a cordless phone, a SIP (Session Initiation Protocol) phone, a WLL (wireless local loop) station, a PDA (personal digital assistant), a handheld device having a wireless communication function, a computing device or another processing device connected to a wireless modem, an in-vehicle device, a wearable device, or a terminal device in a future 5G network.

In addition, the present invention describes various embodiments with reference to a network device. The network device may be a device, such as a network-side device, that is configured to communicate with a mobile device. The network-side device may be a BTS (base transceiver station) in GSM (Global System of Mobile communication, Global system for mobile communications) or CDMA (Code Division Multiple Access), or may be an NB (NodeB) in WCDMA (Wideband Code Division Multiple Access), or may be an eNB or eNodeB (Evolutional Node B, evolved NodeB) in LTE (Long Term Evolution), or a relay node or an access point, or an in-vehicle device, a wearable device, or a network-side device in a future 5G network.

In addition, aspects or features of the present invention may be implemented as a method, an apparatus or a product that uses standard programming and/or engineering technologies. The term "product" used in this application covers a computer program that can be accessed from any computer readable component, carrier or medium. For example, the computer-readable medium may include but is not limited to: a magnetic storage component (for example, a hard disk, a floppy disk, or a magnetic tape), an optical disc (for example, a CD (compact disk), a DVD (Digital Versatile Disk, digital versatile disk), a smart card and a flash memory component (for example, EPROM (erasable programmable read-only memory), a card, a stick, or a key drive). In addition, various storage media described in this specification may indicate one or more devices and/or other machine-readable media that is used to store information. The term "machine readable media" may include but is not limited to a radio channel, and various other media that can store, contain and/or carry an instruction and/or data.

FIG. 1 is a schematic diagram of a communications system of an information transmission method according to the present invention.

As shown in FIG. 1, the communications system 100 includes a network-side device 102, and the network-side device 102 may include multiple antenna groups. Each antenna group may include multiple antennas. For example, an antenna group may include an antenna 104 and an antenna 106, another antenna group may include an antenna 108 and an antenna 110, and an additional group may include an antenna 112 and an antenna 114. In FIG. 1, two antennas are shown in each antenna group, but more or fewer antennas may be used in each group. The network-side device 102 may additionally include a transmitter link and a receiver link. A person of ordinary skill in the art may understand that both the transmitter link and the receiver link may include multiple components related to signal sending and receiving (for example, a processor, a modulator, a multiplexer, a demodulator, a demultiplexer, or an antenna).

The network-side device 102 may communicate with multiple terminal devices (for example, a terminal device 116 and a terminal device 122). However, it may be understood that the network-side device 102 may communicate with any quantity of terminal devices similar to the terminal device 116 or the terminal device 122. For example, the terminal device 116 or the terminal device 122 may be a cellular phone, a smartphone, a portable computer, a handheld communications device, a handheld computing device, a satellite radio apparatus, a Global Positioning System, a PDA, and/or any other appropriate device that is configured to communicate in the wireless communications system 100.

As shown in FIG. 1, the terminal device 116 communicates with the antenna 112 and the antenna 114. The antenna 112 and the antenna 114 send information to the terminal device 116 by using a forward link 118, and receive information from the terminal device 116 by using a reverse link 120. In addition, the terminal device 122 communicates with the antenna 104 and the antenna 106. The antenna 104 and the antenna 106 send information to the terminal device 122 by using a forward link 124, and receive information from the terminal device 122 by using a reverse link 126.

For example, in a frequency division duplex (FDD) system, for example, the forward link 118 may use a frequency band different from a frequency band used by the reverse link 120, and the forward link 124 may use a frequency band different from a frequency band used by the reverse link 126.

For another example, in a time division duplex (TDD) system and a full duplex system, the forward link 118 and the reverse link 120 may use a same frequency band, and the forward link 124 and the reverse link 126 may use a same frequency band.

Each group of antennas and/or an area that are/is designed for communication are/is referred to as a sector of the network-side device 102. For example, an antenna group may be designed to communicate with a terminal device in the sector of a coverage area of the network-side device 102. In a process in which the network-side device 102 communicates with the terminal device 116 and the terminal device 122 by using the forward link 118 and the forward link 124 respectively, a transmit antenna of the network-side device 102 may improve a signal-to-noise ratio of the forward link 118 and a signal-to-noise ratio of the forward link 124 by means of beamforming. In addition, compared with a manner in which a network-side device sends signals to all terminal devices by using a single antenna, when the network-side device 102 sends, by means of beamforming, signals to the terminal device 116 and the terminal device 122 that are randomly distributed in a related coverage area, a mobile device in a neighboring cell is less interfered.

At a given time, the network-side device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain (for example, generate, receive from another communications apparatus, or store in a memory) a specific quantity of data bits that need to be sent to the wireless communications receiving apparatus through a channel. The data bits may be included in a transport block (or multiple transport blocks) of data. The transport block may be segmented to generate multiple code blocks.

For ease of understanding, the following describes a HARQ information transmission method in an LTE system.

HARQ information is transmitted between a terminal device and a network device on a PUSCH channel in the LTE system. The network device transmits information to the terminal device. If a data transmission error is in an error-correction range of FEC, the terminal device can perform correct decoding, and the terminal device feeds back HARQ-ACK information to the network device. If a data transmission error is not in an error-correction range of FEC, the terminal device cannot perform correct decoding, and the terminal device feeds back HARQ-NACK information to the network device.

When the HARQ information is transmitted on the PUSCH channel, the HARQ information first needs to be encoded. The HARQ information may include the HARQ-ACK information and the HARQ-NACK information. Specifically, a manner of encoding the HARQ-ACK information in the HARQ information may be as follows:

If the HARQ-ACK information includes 1 bit $[o_0^{ACK}]$, encoding is performed according to Table 1. If the HARQ-ACK information includes 2 bits $[o_1^{ACK} o_0^{ACK}]$, encoding is performed according to Table 2.

TABLE 1

| $Q_m$ | Encoded HARQ-ACK information |
|---|---|
| 2 | $[o_0^{ACK}\ y]$ |
| 4 | $[o_0^{ACK}\ y\ x\ x]$ |
| 6 | $[o_0^{ACK}\ y\ x\ x\ x\ x]$ |

TABLE 2

| $Q_m$ | Encoded HARQ-ACK information |
|---|---|
| 2 | $[o_0^{ACK}\ o_1^{ACK}\ o_2^{ACK}\ o_0^{ACK}\ o_1^{ACK}\ o_2^{ACK}]$ |
| 4 | $[o_0^{ACK}\ o_1^{ACK}\ x\ x\ o_2^{ACK}\ o_0^{ACK}\ x\ x\ o_1^{ACK}\ o_2^{ACK}\ x\ x]$ |
| 6 | $[o_0^{ACK}\ o_1^{ACK}\ x\ x\ x\ x\ o_2^{ACK}\ o_0^{ACK}\ x\ x\ x\ x\ o_1^{ACK}\ o_2^{ACK}\ x\ x\ x]$ |

$o_2^{ACK} = (o_0^{ACK} + o_1^{ACK}) \bmod 2$; $Q_m$ represents a modulation order, and may indicate that a modulation symbol that includes $Q_m$ bits is mapped to a time-frequency resource during constellation modulation; and x and y represent placeholders, and are used to widen a distance between modulation symbols that carry the HARQ-ACK information or the HARQ-NACK information, so as to improve a decoding rate.

Whether encoded HARQ information needs other calculation such as scrambling or up-conversion is determined according to a transmission mode of the encoded HARQ information. However, a total encoding length remains unchanged. Assuming that the encoded HARQ information is obtained after bit encoding is performed on the HARQ information, the terminal device further performs modulation and mapping processing on the encoded HARQ information. A first step: Perform constellation modulation on the encoded HARQ information, to obtain a HARQ modulation symbol. A second step: Map the HARQ modulation symbol to an allocated time-frequency resource.

In the first step, the terminal device may encode 1-bit HARQ information, to obtain encoded HARQ information, where an encoding length is $Q_m$ bits; and then perform constellation modulation on the encoded HARQ information, to obtain one modulation symbol. The terminal device may encode 2-bit HARQ information, to obtain encoded HARQ information, where an encoding length is $3*Q_m$ bits; and then perform constellation modulation on the encoded HARQ information, to obtain three modulation symbols.

In the second step, the terminal device may map the modulation symbol to the allocated time-frequency resource according to the following rule: For example, a HARQ modulation symbol exists in either timeslot of a subframe, and the HARQ modulation symbols may be mapped to one side or two sides of a modulation symbol of a demodulation reference signal (DMRS).

Specifically, a mapping order may be that demodulation pilots DMRSs are respectively mapped in two timeslots of a subframe, that is, one DMRS may be mapped in each timeslot. Then, uplink data obtained after bit encoding is mapped on a remaining time-frequency resource. Finally, the HARQ modulation symbols are sequentially mapped to the two sides of the DMRS according to a multiplexing rule.

The foregoing describes the HARQ information transmission method in the LTE system.

Sparse code multiple access (SCMA) is a non-orthogonal multiple access technology. Certainly, a person skilled in the art may call the technology another technology name other than SCMA. In this technology, multiple different data streams are transmitted on a same transmission resource by using a codebook, and different data streams use different codebooks, so as to improve resource utilization. The data streams may be from a same terminal device or may be from different terminal devices. However, when terminal devices use a same time-frequency resource in an SCMA system, according to the foregoing HARQ information transmission method, HARQ modulation symbols of terminal devices may be overlapped with each other, and demodulation cannot be performed. To resolve this problem, embodiments of the present invention provide an information transmission method and a terminal device, so as to accurately transmit HARQ information, and improve transmission reliability.

Figure 2:
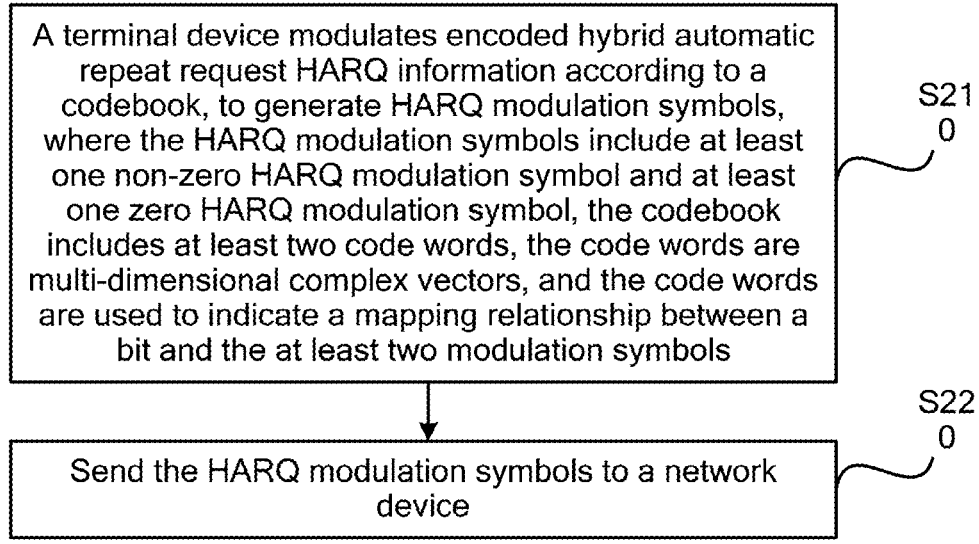
FIG. 2 is a schematic flowchart of an information transmission method according to an embodiment of the present invention.

FIG. 2 is a schematic flowchart of an information transmission method according to an embodiment of the present invention. The method 200 may be executed by a terminal device. As shown in FIG. 2, the method 200 includes the following steps.

S210. The terminal device modulates encoded hybrid automatic repeat request (HARQ) information according to a codebook, to generate HARQ modulation symbols, where the HARQ modulation symbols include at least one non-zero HARQ modulation symbol and at least one zero HARQ modulation symbol, the codebook includes at least two code words, the code words are multi-dimensional complex vectors, and the code words are used to indicate a mapping relationship between a bit and at least two modulation symbols.

S220. Send the HARQ modulation symbols to a network device.

In this embodiment of the present invention, encoded HARQ information is modulated according to a codebook, so that when multiple terminal devices transmit HARQ information by using a same time-frequency resource, correct decoding can be performed on a network device side. Therefore, in this embodiment of the present invention, HARQ information can be transmitted in a system in which multiple terminal devices use a same time-frequency resource, thereby improving reliability of information transmission.

Specifically, for the foregoing same time-frequency resource, for example, when a time-frequency resource is divided in a resource element (RE) unit, the foregoing time-frequency resource may be a time-frequency resource block (or may be referred to as a time-frequency resource group) that includes multiple resource elements. In addition, the multiple resource elements may have a same time-domain location (that is, correspond to a same symbol) and have different frequency-domain locations (that is, correspond to different subcarriers). Alternatively, the multiple resource elements may have different time-domain locations (that is, correspond to different symbols) and have a same frequency-domain location (that is, correspond to a same subcarrier). This is not specifically limited in the present invention.

Optionally, the modulation is performed by using a code word. The code word is a multi-dimensional complex vector, and is used to indicate a mapping relationship between the encoded HARQ information and at least two modulation symbols. The mapping relationship may be understood as a direct mapping relationship. The at least two modulation symbols include at least one zero modulation symbol and at least one non-zero modulation symbol.

Optionally, that the terminal device modulates the encoded HARQ information according to the codebook includes:

the terminal device modulates the encoded HARQ information in a sparse code multiple access SCMA manner.

Specifically, sparse code multiple access (SCMA) is a non-orthogonal multiple access technology. Certainly, a person skilled in the art may call the technology another technology name other than SCMA. In this technology, multiple different data streams are transmitted on a same transmission resource by using a codebook, and different data streams use different codebooks, so as to improve resource utilization. The data streams may be from a same terminal device or may be from different terminal devices.

The codebook used in SCMA is a set of at least two code words, and a same codebook may have different code words.

The code words may be multi-dimensional complex vectors. The code words are of at least two dimensions, and are used to indicate a mapping relationship between data and at least two modulation symbols. The modulation symbols include at least one zero modulation symbol and at least one non-zero modulation symbol. The data may be binary bit data or multivariate data. Optionally, a relationship between the zero modulation symbol and the non-zero modulation symbol may be that a quantity of zero modulation symbols is not less than a quantity of non-zero modulation symbols.

The codebook includes at least two code words. The codebook may represent a mapping relationship between a possible data combination of specific-length data and the code words in the codebook. The mapping relationship may be a direct mapping relationship.

According to the SCMA technology, data in a data stream is directly mapped to code words, that is, multi-dimensional complex vectors, in the codebook according to a specific mapping relationship, so that data can be sent by extending to multiple resource elements. The data herein may be binary bit data or multivariate data. The multiple resource elements may be resource elements in a time domain, a frequency domain, a space domain, a time-frequency domain, a time-space domain, or a time-frequency-space domain.

A characteristic sequence in this specification corresponds to the codebook, and includes a zero element and a one element. The zero element indicates that elements that are of code words in a corresponding codebook and are at corresponding locations of the zero element are zero. The one element indicates that elements that are of code words in a corresponding codebook and are at corresponding locations of the one element are not all zero or are not zero. A characteristic matrix includes at least two characteristic sequences. It should be understood that SCMA is only a name, and the technology may be represented by another name in the industry.

Code words used in SCMA may be sparse, for example, a quantity of zero elements in the code words may be not less than a quantity of modulation symbols, so that a receive end can perform low-complexity decoding by using a multi-user detection technology. Herein, the foregoing listed relationship between a quantity of zero elements and a quantity of modulation symbols is merely an example of sparsity. This is not limited in the present invention. A proportion between a quantity of zero elements and a quantity of non-zero elements may be randomly set according to a need.

An SCMA system may be listed as an example of the foregoing communications system 100. In the system 100, multiple users transmit data by multiplexing a same time-frequency resource block. Each resource block includes several resource elements REs. The resource elements herein may be subcarrier-symbol units in an OFDM technology, or may be time-domain or frequency-domain resource elements in another air-interface technology. For example, in an SCMA system that includes L terminal devices, an available resource is divided into several orthogonal time-frequency resource blocks, and each resource block includes U resource elements. The U resource elements may have a same time-domain location. When a terminal device #L sends data, the to-be-sent data is first divided into data blocks of S bits, each data block is mapped, by searching a codebook (determined by the network device and delivered to the terminal device), to a group of modulation symbol sequence $X\#L=\{X\#L_1, X\#L_2, \ldots, X\#L_U\}$ that includes U modulation symbols, and each modulation symbol in the sequence corresponds to a resource element in a resource block. Then, a signal waveform is generated according to the modulation symbols. For the data blocks of S bits, each codebook has 2S different modulation symbol groups, and the 2S different modulation symbol groups correspond to 2S possible data blocks.

The foregoing codebook may be referred to as an SCMA codebook, and is a set of SCMA code words. An SCMA code word represents a mapping relationship between an information bit and a modulation symbol. That is, the SCMA codebook is a set of the foregoing mapping relationships.

In addition, in SCMA, in a group of modulation symbols $X\#k=\{X\#k_1, X\#k_2, \ldots, X\#k_L\}$ corresponding to each terminal device, at least one symbol is a zero symbol, and at least one symbol is a non-zero symbol. That is, for data of one terminal device, only some resource elements (at least one resource element) in L resource elements carry the data of the terminal device.

Figure 3:
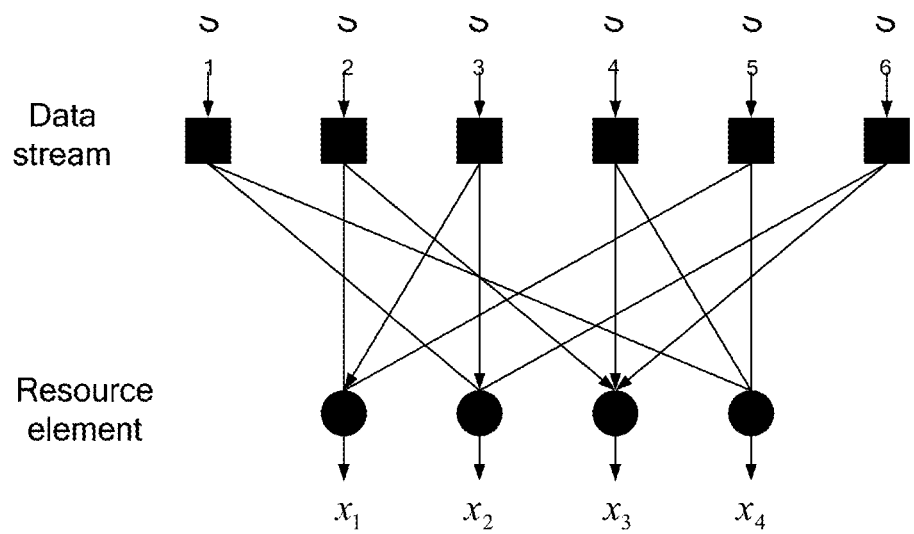
FIG. 3 is a schematic diagram of bit mapping processing in SCMA.

FIG. 3 shows a schematic diagram of bit mapping processing (or encoding processing) in SCMA by using an example in which six data streams multiplex four resource elements. The schematic diagram is a bipartite graph. As shown in FIG. 3, the six data streams form a group, and the four resource elements form an encoding unit. A resource element may be a subcarrier, or a resource element, or an antenna port.

In FIG. 3, a line existing between a data stream and a resource element indicates that a non-zero modulation symbol obtained after at least one data combination of the data stream is mapped by using a code word is sent on the resource element, and none line existing between a data stream and a resource element indicates that modulation symbols that are obtained after all possible data combinations of the data stream are mapped by using a code word and that are sent on the resource element are zero. A data combination of a data stream may be understood as the following description. For example, in a binary bit data stream, 00, 01, 10, and 11 are all possible 2-bit data combinations.

For ease of description, s1 to s6 sequentially represent to-be-sent data combinations of the six data streams in FIG. 3, and x1 to x4 sequentially represent symbols sent on the four resource elements in FIG. 3. A line existing between a data stream and a resource element indicates that a modulation symbol is sent on the resource element after data of the data stream is extended. The modulation symbol may be a zero modulation symbol (corresponding to a zero element), or may be a non-zero modulation symbol (corresponding to a non-zero element). None line existing between a data stream and a resource element indicates that none modulation symbol is sent on the resource element after data of the data stream is extended.

It can be learned from FIG. 3 that modulation symbols obtained after data of all data streams are mapped by using code words are sent on at least two resource elements, and a symbol sent on each resource element is obtained by overlaying modulation symbols obtained after data of at least two data streams is mapped by using respective code words. For example, non-zero modulation symbols obtained after a to-be-sent data combination s3 of a data stream 3 is mapped by using a coed word may be sent on a resource element 1 and a resource element 2. However, data x3 sent on a resource element 3 is obtained by overlaying non-zero modulation symbols obtained after a to-be-sent data combination s2 of a data stream 2, a to-be-sent data combination s4 of a data stream 4, and a to-be-sent data combination s6 of a data stream 6 are mapped by using respective code words. Because a quantity of data streams may be greater than a quantity of resource elements, the SCMA system may effectively improve a network capacity, including a quantity of users that can access the system, spectral efficiency, and the like.

With reference to the foregoing description of a codebook and FIG. 3, a code word in the codebook is generally in the following form:

$$\begin{pmatrix} c_{1,q} \\ c_{2,q} \\ \vdots \\ c_{N,q} \end{pmatrix}$$

The corresponding codebook is generally in the following form:

$$\left\{ \begin{pmatrix} c_{1,1} \\ c_{2,1} \\ \vdots \\ c_{N,1} \end{pmatrix}, \begin{pmatrix} c_{1,2} \\ c_{2,2} \\ \vdots \\ c_{N,2} \end{pmatrix}, \ldots, \begin{pmatrix} c_{1,Q_m} \\ c_{2,Q_m} \\ \vdots \\ c_{N,Q_m} \end{pmatrix} \right\},$$

where

N is a positive integer greater than 1, and may represent a quantity of resource elements included in an encoding unit, or may be understood as a length of a code word. $Q_m$ is a positive integer greater than 1, and represents a quantity of code words included in the codebook, or may be understood as a modulation order. Certainly, a person skilled in the art may call the modulation order another name. For example, $Q_m$ is 4 during 4-order modulation. q is a positive integer, and $1 \leq q \leq Q_m$. An element c, included in the codebook and the code word is a complex, and $c_{n,q}$ may be represented as follows in mathematics:

$$c_{n,q} \in \{0, \alpha^*\exp(j^*\beta)\}, 1 \leq n \leq N, 1 \leq q \leq Q_m, \text{where}$$

α and β may be any real numbers, and N and $Q_m$ are positive integers.

A mapping relationship may be formed between the code word in the codebook and data. For example, a mapping relationship formed between the code word in the codebook and a 2-bit data combination of a binary data stream may be as follows:

For example, "00" may correspond to a code word 1, that is, $$\begin{pmatrix} c_{1,1} \\ c_{2,1} \\ \vdots \\ c_{N,1} \end{pmatrix};$$

"01" may correspond to a code word 2, that is, $$\begin{pmatrix} c_{1,2} \\ c_{2,2} \\ \vdots \\ c_{N,2} \end{pmatrix};$$

"10" may correspond to a code word 3, that is, and $$\begin{pmatrix} c_{1,3} \\ c_{2,3} \\ \vdots \\ c_{N,3} \end{pmatrix};$$

"11" may correspond to a code word 4, that is, $$\begin{pmatrix} c_{1,4} \\ c_{2,4} \\ \vdots \\ c_{N,4} \end{pmatrix}.$$

With reference to the foregoing FIG. 3, when a line exists between a data stream and a resource element, a codebook corresponding to the data stream and a code word in the codebook may have the following characteristic: a non-zero modulation symbol included in at least one code word in the codebook is sent on the corresponding resource element. For example, if a line exists between a data stream 3 and a resource element 1, at least one code word in a codebook corresponding to the data stream 3 satisfies $c_{1,q} \neq 0$, and $1 \leq q \leq Q_m$.

When none line exists between a data stream and a resource element, a codebook corresponding to the data stream and a code word in the codebook may have the following characteristic: zero modulation symbols included in all code words in the codebook are sent on the corresponding resource element. For example, if none line exists between a data stream 3 and a resource element 3, any code word in a codebook corresponding to the data stream 3 satisfies $c_{3,q}=0$, and $1 \leq q \leq Q_m$.

In conclusion, when the modulation order is 4, a codebook corresponding to a data stream 3 in FIG. 3 may be in the following form and have the following characteristic:

$$\left\{ \begin{pmatrix} c_{1,1} \\ c_{2,1} \\ 0 \\ 0 \end{pmatrix}, \begin{pmatrix} c_{1,2} \\ c_{2,2} \\ 0 \\ 0 \end{pmatrix}, \begin{pmatrix} c_{1,3} \\ c_{2,3} \\ 0 \\ 0 \end{pmatrix}, \begin{pmatrix} c_{1,4} \\ c_{2,4} \\ 0 \\ 0 \end{pmatrix} \right\},$$

where $c_{n,q}=\alpha^*\exp(j^*\beta)$, $1 \leq n \leq 2$, $1 \leq q \leq 4$; α and β may be any real numbers; for any q, $1 \leq q \leq 4$; $c_{1,q}$ and $c_{2,q}$ are zero at different times; and there is at least one group of $q_1$ and $q_2$, $1 \leq q_1$, and $q_2 \leq 4$, and $q_2 \leq 4$, so that $c_{1,q_1} \neq 0$ and $c_{2,q_2} \neq 0$.

For example, if data s3 of the data stream 3 is "10", the data combination is mapped to a code word, that is, a four-dimensional complex vector, according to the foregoing mapping rule, and the code word is as follows:

$$\begin{pmatrix} c_{1,3} \\ c_{2,3} \\ 0 \\ 0 \end{pmatrix}.$$

Further, in the SCMA system, the bipartite graph may be represented by using a characteristic matrix. The characteristic matrix may be in the following form:

$$\begin{pmatrix} r_{1,1} & r_{1,2} & \cdots & r_{1,M} \\ r_{2,1} & r_{2,2} & \cdots & r_{2,M} \\ \vdots & \vdots & \cdots & \vdots \\ r_{N,1} & r_{N,2} & \cdots & r_{N,M} \end{pmatrix}_{N \times M},$$

where $r_{n,m}$ represents an element in the characteristic matrix; m and n are natural numbers, and $1 \leq n \leq N$, $1 \leq m \leq M$; N rows represent N resource elements in an encoding unit; and M columns represent a quantity of multiplexed data streams. Although the characteristic matrix may be represented in a general form, the characteristic matrix may have the following characteristics:

(1). An element in the characteristic matrix satisfies $r_{n,m} \in \{0,1\}$, $1 \leq n \leq N$, $1 \leq m \leq M$. $r_{n,m}=1$ may indicate that a line exists between the $m^{th}$ data stream and a resource element n according to a corresponding bipartite graph, or may indicate that a non-zero modulation symbol is obtained after at least one data combination of the $m^{th}$ data stream is mapped by using a code word. $r_{n,m}=0$ may indicate that none line exists between the $m^{th}$ data stream and a resource element n according to a corresponding bipartite graph, or may indicate that zero modulation symbols are obtained after all possible data combinations of the $m^{th}$ data stream are mapped by using code words.

(2). Further, optionally, a quantity of zero elements may be not less than a quantity of one elements in the characteristic matrix, so as to present a characteristic of sparse encoding.

In addition, a column in the characteristic matrix may be referred to as a characteristic sequence. The characteristic sequence may be represented in the following form:

$$\begin{pmatrix} r_{1,m} \\ r_{2,m} \\ \vdots \\ r_{N,m} \end{pmatrix}, 1 \leq m \leq M.$$

Therefore, the characteristic matrix may be considered as a matrix that includes a series of characteristic sequences.

With reference to the foregoing characteristic description of the characteristic matrix, for the example shown in FIG. 3, a corresponding characteristic matrix may be represented as follows:

$$\begin{pmatrix} 0 & 1 & 1 & 0 & 1 & 0 \\ 1 & 0 & 1 & 0 & 0 & 1 \\ 0 & 1 & 0 & 1 & 0 & 1 \\ 1 & 0 & 0 & 1 & 1 & 0 \end{pmatrix}.$$

A characteristic sequence corresponding to the codebook $$\left\{ \begin{pmatrix} c_{1,1} \\ c_{2,1} \\ 0 \\ 0 \end{pmatrix}, \begin{pmatrix} c_{1,2} \\ c_{2,2} \\ 0 \\ 0 \end{pmatrix}, \begin{pmatrix} c_{1,3} \\ c_{2,3} \\ 0 \\ 0 \end{pmatrix}, \begin{pmatrix} c_{1,4} \\ c_{2,4} \\ 0 \\ 0 \end{pmatrix} \right\}$$

used by the data stream 3 in FIG. 3 may be represented as $$\begin{pmatrix} 1 \\ 1 \\ 0 \\ 0 \end{pmatrix}.$$

It may be considered that a relationship of a codebook to a characteristic sequence is a one-to-one relationship, that is, one codebook uniquely corresponds to one characteristic sequence; a relationship of a characteristic sequence to a codebook may be a one-to-many relationship, that is, one characteristic sequence corresponds to at least one codebook. Therefore, the characteristic sequence may be understood as: the characteristic sequence corresponds to the codebook, and includes a zero element and a one element. The zero element indicates that elements that are of code words in a corresponding codebook and are at corresponding locations of the zero element are zero. The one element indicates that elements that are of code words in a corresponding codebook and are at corresponding locations of the one element are not all zero or are not zero. The corresponding relationship between the characteristic sequence and the codebook may be determined by the following two conditions:

(1). Code words in the codebook and the corresponding characteristic sequence have a same total quantity of elements.

(2) For any element location at which a value is 1 in the characteristic sequence, at least one code word can be found in the corresponding codebook, so that an element, at a same location, of the code word is not zero. For any element location at which a value is 0 in the characteristic sequence, elements, at a same location, of all code words in the corresponding codebook are zero.

It should be further understood that, in the SCMA system, a codebook may be directly represented and stored. For example, the foregoing codebook or code words in the codebook are stored, or only an element that is of a code word and is at a location at which a corresponding characteristic sequence element is 1 is stored. Therefore, when the present invention is applied, it should be assumed that both a base station and user equipment in the SCMA system can store some or all of the following predesigned contents:

(1). One or more SCMA characteristic matrixes:

$$\begin{pmatrix} r_{1,1} & r_{1,2} & \cdots & r_{1,M} \\ r_{2,1} & r_{2,2} & \cdots & r_{2,M} \\ \vdots & \vdots & \cdots & \vdots \\ r_{N,1} & r_{N,2} & \cdots & r_{N,M} \end{pmatrix}_{N \times M},$$

where $r_{n,m} \in \{0,1\}$, and $1 \leq n \leq N$, $1 \leq m \leq M$; both M and N are integers greater than 1; M represents a quantity of multiplexed data streams; and N is a positive integer greater than 1, and may represent a quantity of resource elements included in an encoding unit, or may be understood as a length of a code word.

(2). One or more SCMA characteristic sequences:

$$\begin{pmatrix} r_{1,m} \\ r_{2,m} \\ \vdots \\ r_{N,m} \end{pmatrix},$$

where
$1 \leq m \leq M$.

(3). One or more SCMA codebooks:

$$\left\{ \begin{pmatrix} c_{1,1} \\ c_{2,1} \\ \vdots \\ c_{N,1} \end{pmatrix}, \begin{pmatrix} c_{1,2} \\ c_{2,2} \\ \vdots \\ c_{N,2} \end{pmatrix}, \cdots, \begin{pmatrix} c_{1,Q_m} \\ c_{2,Q_m} \\ \vdots \\ c_{N,Q_m} \end{pmatrix} \right\},$$

where $Q_m \geq 2$, $Q_m$ may be modulation orders corresponding to the codebooks, and each codebook may correspond to a modulation order; N is a positive integer greater than 1, and may represent a quantity of resource elements included in an encoding unit, or may be understood as a length of a code word.

It should be understood that the foregoing listed SCMA system is only an example of a communications system that is applicable to the information transmission method and the apparatus of the present invention. This is not limited in the present invention. Another communications system that can make terminal devices multiplex a same time-frequency resource to transmit information in a same time period falls within the protection scope of the present invention.

For ease of understanding and description, in the following embodiment, unless otherwise noted, a data processing method in the embodiment of the present invention is described by using an example in which the data processing method is applied in the SCMA system.

In addition, in this embodiment of the present invention, the foregoing modulation process may be similar to a modulation process in an existing SCMA system. Herein, to avoid repetition, detailed description of the modulation process is omitted. Because of a sparsity requirement of the SCMA system for a codebook, a modulation symbol sequence that corresponds to each terminal device and is generated in the modulation process of S110 includes U symbols (corresponding to U resource elements) in total, and V symbols are non-zero symbols.

For ease of description, the time-frequency resource in this embodiment of the present invention may include L resource elements. The L resource elements REs may have a same time-domain location (that is, correspond to a same symbol) and have different frequency-domain locations (that is, correspond to different subcarriers).

Optionally, the modulation process is performed by using a code word. The code word is a multi-dimensional complex vector, and is used to indicate a mapping relationship between the encoded HARQ information and at least two modulation symbols. The at least two modulation symbols include at least one zero modulation symbol and at least one non-zero modulation symbol.

It should be understood that the terminal device in this embodiment of the present invention may be a terminal device that needs to send HARQ information. A target terminal device may be any one of multiple terminal devices that need to send HARQ information. For ease of description, in this embodiment of the present invention, only one target terminal device is described. Another terminal device that needs to send HARQ information may also perform a corresponding operation.

Optionally, the codebook may be a codebook selected by the target terminal device from a codebook set predefined by the network device, or may be a codebook allocated by the network device to the target terminal device. This is not limited in this embodiment of the present invention. It should be further understood that, in the modulation process, different modulation symbols are generated according to different codebooks.

Optionally, a method for performing bit encoding on HARQ information in this embodiment of the present invention may be the same as a bit encoding method in an LTE system, or another bit encoding method may be used. This is not limited in this embodiment of the present invention. In the bit encoding process, encoding may be performed based on Table 1 and Table 2, or may be completed by integrating with another operation, to directly obtain encoded HARQ information.

Specifically, HARQ-ACK information is used as an example. If bit encoding is performed on $Q_{ACK}$ pieces of HARQ-ACK information, $Q_{ACK}$ groups of encoded HARQ information $q_0^{ACK}$, $q_1^{ACK}$, $q_2^{ACK}$, ..., $q_{Q_{ACK}-1}^{ACK}$ are obtained. $q_i^{ACK}=(\tilde{q}_0, \ldots, \tilde{q}_{Q_m-1})$ is a group of the encoded HARQ information.

It should be understood that, when sending the HARQ modulation symbols to the network device, the terminal device may map the HARQ modulation symbols to allocated time-frequency resources. In this embodiment of the present invention, this step may be further divided into two parts. A first step: Modulate the encoded HARQ information, to obtain the HARQ modulation symbols. A second step: Map the HARQ modulation symbols to the allocated time-frequency resources.

Specifically, when multiple terminals in the system share L resource elements, in this embodiment of the present invention, before the HARQ modulation symbols are sent, the method may further include the following steps.

A first step: Modulate the encoded HARQ information according to the codebook, to obtain L HARQ modulation symbols. $Q_{ACK}$ pieces of HARQ modulation information $x_0$, $x_1$, ..., $x_{Q_{ACK}-1}$ are obtained after modulation is performed on $Q_{ACK}$ groups of the encoded HARQ information $q_0^{ACK}$, $q_1^{ACK}$, $q_2^{ACK}$, ..., $q_{Q_{ACK}-1}^{ACK}$. $X_k=\{X_{k,1}, X_{k,1}, \ldots, X_{k,L}\}$ are the L HARQ modulation symbols obtained after modulation is performed according to the codebook $C_k$ of a user. The L HARQ modulation symbols correspond one-to-one to the L resource elements.

A second step: Map the L HARQ modulation symbols to allocated time-frequency resources (that is, the L resource elements). Different from the LTE system, for the L HARQ modulation symbols, one $X_k$ is mapped each time, that is, the L HARQ modulation symbols are mapped to the corresponding L resource elements each time. It should be understood that the L resource elements resource elements may have a same time-domain location (that is, correspond to a same symbol) and have different frequency-domain locations (that is, correspond to different subcarriers). The mapping rule may be similar to a mapping rule in the LTE system, that is, mapping is started from the last L rows, and the L modulation symbols are sequentially mapped to four symbols on two sides of a DMRS, and are sequentially mapped to L resource elements of one symbol. If mapping of some HARQ modulation symbols is still not completed, mapping is performed on L rows sequentially added upwards, until mapping of all HARQ modulation symbols is completed.

In this embodiment of the present invention, encoded HARQ information is modulated according to a codebook, so that when multiple terminal devices transmit HARQ information by using a same time-frequency resource, correct decoding can be performed on a network device side. Therefore, in this embodiment of the present invention, HARQ information can be transmitted in a system in which multiple terminal devices use a same time-frequency resource, thereby improving reliability of information transmission.

Correspondingly, for another terminal device that needs to send HARQ information, modulation may also be performed by using the foregoing method. In this embodiment of the present invention, only one terminal device is described in detail.

Optionally, in another embodiment, if a modulation order is K, a length of the encoded HARQ information is N×K, K is an integer multiple of 2, and N is a positive integer greater than 0. In this embodiment of the present invention, a name of the modulation order may also be replaced with another name. This is not repeatedly described in the following embodiments.

Specifically, when N=1, the bit encoding method is the same as the foregoing bit encoding method in the LTE system. When N>1, the bit encoding method is an improved bit encoding method. The following describes in detail the bit encoding method.

Optionally, in another embodiment, if a length of HARQ information before encoding is 1 bit, N is equal to 2.

For example, if HARQ-ACK information includes 1 bit $[o_0^{ACK}]$, and the modulation order K is 2, encoded HARQ-ACK information may be 4 bits $[o_0^{ACK} y o_0^{ACK} y]$, that is, N=2. If the modulation order K is 4, encoded HARQ-ACK information may be 8 bits $[o_0^{ACK} y x x o_0^{ACK} y x x]$, that is, N=2. If the modulation order K is 6, HARQ-ACK information obtained after the HARQ-ACK information is encoded may be 12 bits [$o_0^{ACK}$ y x x x x $o_0^{ACK}$ y x x x x], that is, N=2.

Optionally, in another embodiment, if a length of HARQ information before encoding is 2 bits, N is equal to 6.

If HARQ-ACK information includes 2 bits [$o_1^{ACK}$ $o_0^{ACK}$], and the modulation order K is 2, encoded HARQ-ACK information obtained after the HARQ-ACK information is encoded may be 12 bits [$o_0^{ACK}$ $o_1^{ACK}$ $o_2^{ACK}$ $o_0^{ACK}$ $o_1^{ACK}$ $o_2^{ACK}$ $o_0^{ACK}$ $o_1^{ACK}$ $o_2^{ACK}$ $o_0^{ACK}$ $o_1^{ACK}$ $o_2^{ACK}$], that is, N=6. If the modulation order K is 4, encoded HARQ-ACK information obtained after the HARQ-ACK information is encoded may be 24 bits [$o_0^{ACK}$ $o_1^{ACK}$ x x $o_2^{ACK}$ $o_0^{ACK}$ x x $o_1^{ACK}$ $o_2^{ACK}$ x x $o_0^{ACK}$ $o_1^{ACK}$ x x $o_2^{ACK}$ $o_0^{ACK}$ x x $o_1^{ACK}$ $o_2^{ACK}$ x x], N=6. If the modulation order K is 6, encoded HARQ-ACK information obtained after the HARQ-ACK information is encoded may be 36 bits [$o_0^{ACK}$ $o_1^{ACK}$ x x x x $o_2^{ACK}$ $o_0^{ACK}$ x x x x $o_1^{ACK}$ $o_2^{ACK}$ x x x x $o_0^{ACK}$ $o_1^{ACK}$ x x x x $o_2^{ACK}$ $o_0^{ACK}$ x x x x $o_1^{ACK}$ $o_2^{ACK}$ x x x x], that is, N=6.

Similar to the foregoing Table 1 and Table 2, in this bit encoding method, bit encoding may be performed based on Table 3 and Table 4. Table 3 shows a scenario in which N is equal to 2 when a length of the HARQ-ACK information is 1 bit. Table 4 shows a scenario in which N is equal to 2 when a length of the HARQ-ACK information is 2 bits.

TABLE 3

| $Q_m$ | Encoded HARQ-ACK information |
|---|---|
| 2 | [$o_0^{ACK}$ y $o_0^{ACK}$ y] |
| 4 | [$o_0^{ACK}$ y x x $o_0^{ACK}$ y x x] |
| 6 | [$o_0^{ACK}$ y x x x x $o_0^{ACK}$ y x x x x] |

TABLE 4

| $Q_m$ | Encoded HARQ-ACK information |
|---|---|
| 2 | [$o_0^{ACK}$ $o_1^{ACK}$ $o_2^{ACK}$ $o_0^{ACK}$ $o_1^{ACK}$ $o_2^{ACK}$ $o_0^{ACK}$ $o_1^{ACK}$] |
| 4 | [$o_0^{ACK}$ $o_1^{ACK}$ x x $o_2^{ACK}$ $o_0^{ACK}$ x x $o_1^{ACK}$ $o_2^{ACK}$ x x $o_0^{ACK}$ $o_1^{ACK}$ x x] |
| 6 | [$o_0^{ACK}$ $o_1^{ACK}$ x x x x $o_2^{ACK}$ $o_0^{ACK}$ x x x x $o_1^{ACK}$ $o_2^{ACK}$ x x x x] |

$o_2^{ACK}=(o_0^{ACK}+o_1^{ACK})$ mod 2; $Q_m$ represents the modulation order, that is, a modulation symbol obtained by modulating $Q_m$ bits is mapped to a time-frequency resource during mapping; and x and y represent placeholders, and are used to widen a distance between modulation symbols that carry the HARQ-ACK information or HARQ-NACK information, so as to improve a decoding rate.

According to the bit encoding method in this embodiment of the present invention, by using repeated information bits, an encoding length is increased, encoding redundancy is increased, and a distance between HARQ-ACK information bits is widened, so that an error caused by encoding can be decreased.

It should be understood that, for a value of N in this embodiment of the present invention, different encoding lengths may be used according to a state of a channel environment. If the channel environment is good, fewer repetition times may be used. If the channel environment is poor, repetition times may be increased, to ensure reliability of HARQ-ACK information transmission.

Figure 4:
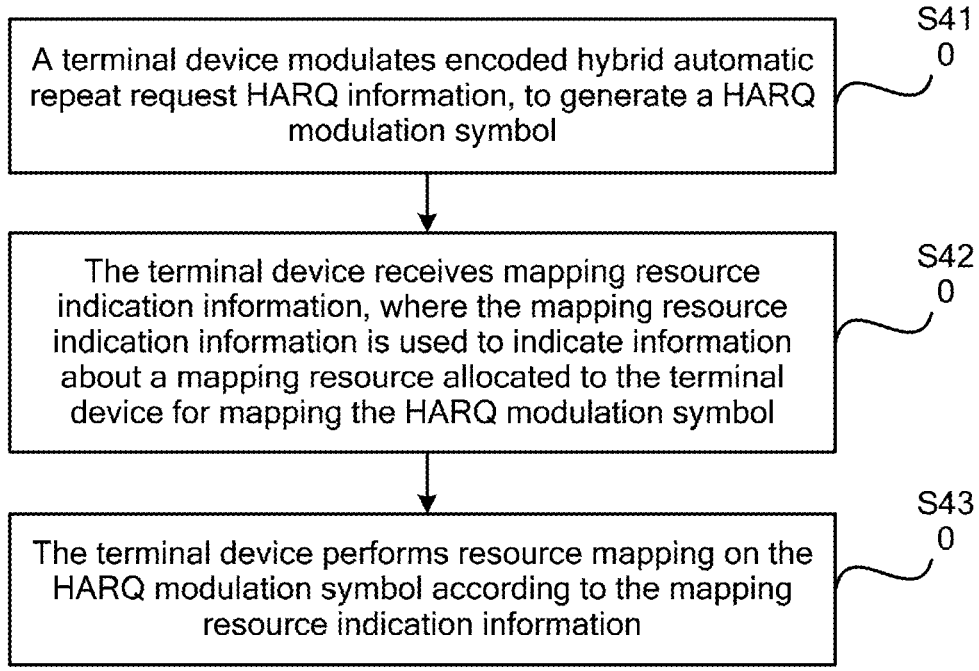
FIG. 4 is a schematic flowchart of an information transmission method according to another embodiment of the present invention.

FIG. 4 is a schematic flowchart of an information transmission method according to another embodiment of the present invention. The method 400 is applied to a communications system that includes at least two terminal devices, and the at least two terminal devices transmit information by using a same time-frequency resource. The method 400 includes the following steps.

S410. A terminal device modulates encoded hybrid automatic repeat request (HARQ) information, to generate a HARQ modulation symbol.

S420. The terminal device receives mapping resource indication information, where the mapping resource indication information is used to indicate information about a mapping resource allocated to the terminal device for mapping the HARQ modulation symbol.

S430. The terminal device performs resource mapping on the HARQ modulation symbol according to the mapping resource indication information.

In this embodiment of the present invention, a manner of mapping encoded HARQ information is changed, and resource mapping is performed on a HARQ modulation symbol according to a resource indicated by indication information of a network device. Therefore, when multiple terminal devices transmit information by using a same time-frequency resource, the information can be mapped to different resources. Therefore, in this embodiment of the present invention, HARQ information can be transmitted in a system in which multiple terminal devices use a same time-frequency resource, thereby improving reliability of information transmission.

During an implementation process of S410, HARQ information may be encoded before modulation.

Specifically, for the foregoing same time-frequency resource, for example, when a time-frequency resource is divided in a resource element (RE) unit, the foregoing time-frequency resource may be a time-frequency resource block (or may be referred to as a time-frequency resource group) that includes multiple resource elements. In addition, the multiple resource elements may have a same time-domain location (that is, correspond to a same symbol) and have different frequency-domain locations (that is, correspond to different subcarriers). Alternatively, the multiple resource elements may have different time-domain locations (that is, correspond to different symbols) and have a same frequency-domain location (that is, correspond to a same subcarrier). This is not specifically limited in the present invention.

Optionally, the modulation process may be performed by using a constellation set.

It should be understood that the terminal device in this embodiment of the present invention may be a terminal device that needs to send HARQ information. The terminal device may be any one of multiple terminal devices that need to send HARQ information. For ease of description, in this embodiment of the present invention, only one terminal device is described. Another terminal device that needs to send HARQ information may also perform a corresponding operation.

Optionally, the constellation set may be a constellation set selected by the terminal device from a constellation set predefined by a network device, or may be a constellation set allocated by a network device to the terminal device. This is not limited in this embodiment of the present invention. It should be further understood that, in this embodiment of the present invention, different terminal devices may use a same constellation set.

Optionally, a method for performing bit encoding on HARQ information in this embodiment of the present invention may be the same as a bit encoding method in an LTE system, or another bit encoding method may be used. This is not limited in this embodiment of the present invention. In the bit encoding process, encoding may be performed based on Table 1 and Table 2, or may be completed by integrating with another operation, to directly obtain encoded HARQ information.

Specifically, HARQ-ACK information is used as an example. If bit encoding is performed on $Q_{ACK}$ pieces of HARQ-ACK information, $Q_{ACK}$ groups of encoded HARQ information $q_0^{ACK}$, $q_1^{ACK}$, $q_2^{ACK}$, ..., $q_{Q_{ACK}-1}^{ACK}$ are obtained. $q_i^{ACK}=(\tilde{q}_0, \ldots, \tilde{q}_{Q_m-1})$ is a group of the encoded HARQ information.

It should be understood that, when sending the HARQ modulation symbol to the network device, the terminal device may map the HARQ modulation symbol to an allocated time-frequency resource. In this embodiment of the present invention, this step may be further divided into two parts. A first step: Modulate the encoded HARQ information, to obtain the HARQ modulation symbol. A second step: Map the HARQ modulation symbol to the allocated time-frequency resource.

In the first step, constellation modulation is performed on the encoded HARQ information according to a preset constellation set, to obtain at least one HARQ modulation symbol. Specifically, in an embodiment, if the HARQ information is 1 bit, one HARQ modulation symbol may be obtained after constellation modulation. If the HARQ information is 2 bits, three HARQ modulation symbols may be obtained after constellation modulation. Certainly, a person skilled in the art should know that modulation may be performed in another manner, that is, modulation is not limited to constellation modulation.

In the second step, the at least one HARQ modulation symbol is mapped to the allocated time-frequency resource (that is, a subcarrier). It should be understood that the subcarrier is a subcarrier allocated to the terminal device. The subcarrier may include at least one resource element. The at least one HARQ modulation symbol generated in the first step corresponds to at least one resource element of a target subcarrier.

It should be understood that subcarriers allocated to different terminal devices are different. That is, a fixed mapping location is allocated to each terminal device. In this way, HARQ modulation symbols of different terminal devices are not overlapped with each other, and correct decoding can be performed at the network device.

Figure 5:
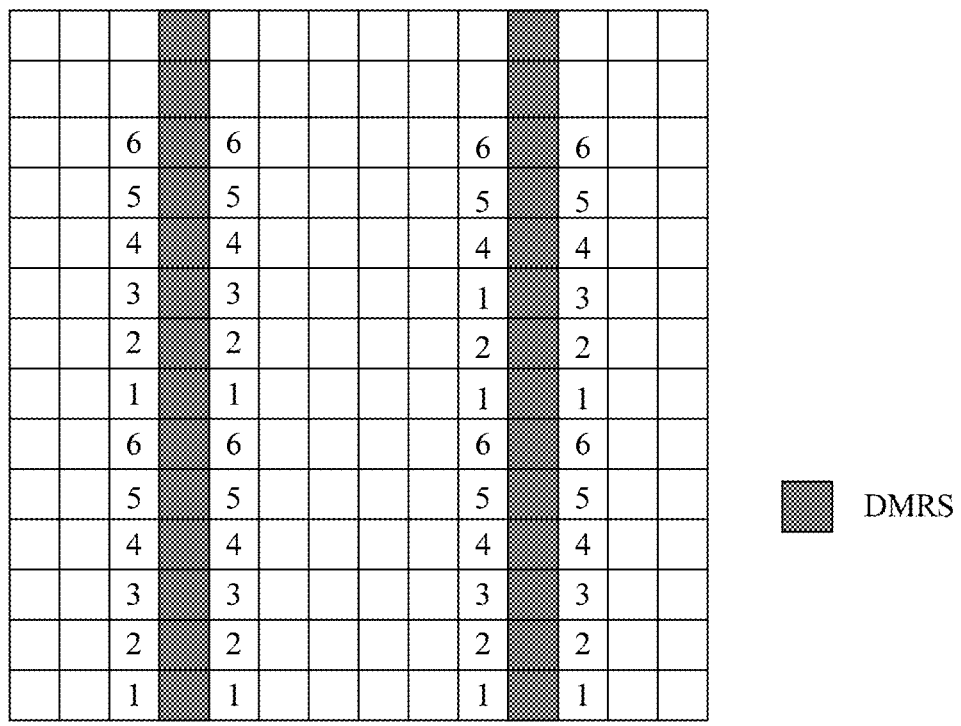
FIG. 5 is a schematic diagram of mapping processing according to an embodiment of the present invention.

The second step in this embodiment of the present invention may be described with reference to FIG. 5. FIG. 5 shows an example in which accessing of a maximum of six terminal devices is allowed in SCMA. Fixed mark numbers on two sides of DMRS symbols represent mapping locations of a terminal device. For example, in a subcarrier corresponding to the last row, four resource elements whose mark numbers are 1 are allocated to a first terminal device. Similarly, in a subcarrier corresponding to the seventh row counted from the bottom, four resource elements whose mark numbers are 1 are also allocated to the first terminal device. In a subcarrier corresponding to the penultimate row, four resource elements whose mark numbers are 2 are allocated to a second terminal device. In a subcarrier corresponding to the eighth row counted from the bottom, four resource elements whose mark numbers are 2 are also allocated to the second terminal device. By analogy, resource elements whose mark numbers are 3, 4, 5, and 6 respectively correspond to a third terminal device, a fourth terminal device, a fifth terminal device, and a sixth terminal device. The six terminal devices are sequentially arranged upwards from the last row, and one modulation symbol is mapped each time, until mapping of HARQ information of all terminal devices is completed.

It should be understood that the terminal device may be any one of terminal devices that are in the at least two terminal devices and that need to send HARQ information. In this embodiment of the present invention, only one terminal device is described. This embodiment of the present invention may also be applied to another terminal device that needs to send HARQ information.

The information about the mapping resource may be information about the subcarrier allocated to the terminal device. A quantity of subcarriers allocated to the terminal device is related to a quantity of bits of the sent HARQ information. Optionally, in another embodiment, a method for indicating, by the mapping resource indication information, the information about the mapping resource allocated to the terminal device is not limited in this embodiment of the present invention, only a resource that needs to be allocated to the terminal device needs to be specified.

It should be further understood that a sequence of a process in which the terminal device performs encoding and a process in which the terminal device receives the mapping resource indication information is not limited in this embodiment of the present invention. A representation form of the mapping resource indication information is not limited in this embodiment of the present invention.

Optionally, in another embodiment, the mapping resource indication information may include identifiers of the at least two terminal devices and a quantity of bits of to-be-sent HARQ information of each terminal device in the at least two terminal devices that is to send the HARQ information, the at least two terminal devices include the terminal device, and the at least two terminal devices transmit data by using a same time-frequency resource.

Optionally, in another embodiment, the mapping resource indication information may include information about a start location of a subcarrier allocated to each terminal device in the at least two terminal devices for sending HARQ information, and a quantity of bits of to-be-sent HARQ information of each terminal device in the at least two terminal devices that is to send the HARQ information, the at least two terminal devices include the terminal device, and the at least two terminal devices transmit data by using a same time-frequency resource.

Optionally, in another embodiment, the mapping resource indication information may include identifiers of the at least two terminal devices, information about a quantity of the at least two terminal devices, and a quantity of bits of a to-be-sent HARQ signal of each terminal device in the at least two terminal devices that is to send the HARQ information, the at least two terminal devices include the terminal device, and the at least two terminal devices transmit data by using a same time-frequency resource.

Specifically, the representation form of the mapping resource indication information is not limited in this embodiment of the present invention. Optionally, in an embodiment, if the system includes six terminal devices, and there are three terminal devices that are to send HARQ information, a target terminal device is a terminal device in the three terminal devices that are to send HARQ information. The indication information may be represented as 101100. Six bits of the indication information respectively correspond to six terminal devices, that is, a terminal device 0, a terminal device 1, a terminal device 2, a terminal device 3, a terminal device 4, a terminal device 5, and a terminal device 6. The terminal device 0, the terminal device 2, and the terminal device 3 corresponding to bit 1 need to send HARQ information. The indication information may further include a quantity of bits of HARQ information of each terminal device that is to send the HARQ information. For example, the indication information may include 2 bits, 1 bit, and 1 bit. It indicates that HARQ information that needs to be sent by the terminal device 0 is 2 bits, HARQ information that needs to be sent by the terminal device 2 is 1 bit, and HARQ information that needs to be sent by the terminal device 3 is 1 bit.

Optionally, in another embodiment, the mapping resource indication information may be 201100. Six bits of the mapping resource indication information respectively correspond to six terminal devices, that is, a terminal device 0, a terminal device 1, a terminal device 2, a terminal device 3, a terminal device 4, a terminal device 5, and a terminal device 6. The terminal device 0, the terminal device 2, and the terminal device 3 corresponding to bit 1 need to send HARQ information. The indication information may further include a quantity of bits of HARQ information of each terminal device that is to send the HARQ information. For example, the indication information may include 2 bits, 1 bit, and 1 bit. The first bit 2 in the indication information indicates that HARQ information that needs to be sent by the terminal device 0 is 2 bits, the third bit 1 indicates that HARQ information that needs to be sent by the terminal device 2 is 1 bit, and the fourth bit 1 indicates that HARQ information that needs to be sent by the terminal device 3 is 1 bit.

Location information of a resource allocated to the terminal device may be determined according to the identifiers of the at least two terminal devices in the mapping resource indication information and the information about the quantity of the at least two terminal devices in the mapping resource indication information.

Specifically, in the 36.212 standard, a process of determining, according to the mapping resource indication information, the location information of the resource (subcarrier) allocated to the terminal device may be as follows:

```
Set i, j to 0.
Set r to R'_mux−1 − Ue_id
while i < Q'_AC
    c_ACK=ColumnSet(j)
    y_r×Cmux+c_ACK = q_i^ACK
    i = i + 1
    r = R'_mux−1−⌊i/4⌋ − UE_NUM
    j = (j + 3)mod4
end while
```

Ue_id is the identifiers of the at least two terminal devices; UE_NUM is the information about the quantity of the at least two terminal devices; r is a row index in a channel interleaving matrix (the row indexes are respectively 0, 1, 2, 3 . . . in sequence from top to bottom); $R_{mux}'$ is a quantity of rows of the channel interleaving matrix (input sequences that are used as input in a channel interleaving module are $g_0, g_1, g_2, \ldots, g_{H'-1}, q_0^{RI}, q_1^{RI}, q_2^{RI}, \ldots, q_{Q'_{RI}-1}^{RI}$, and $q_0^{ACK}, q_1^{ACK}, q_2^{ACK}, \ldots, q_{Q'_{ACK}-1}^{ACK}$, where H' is a quantity of modulation symbols of data and channel quality indication (CQI), $Q'_{RI}$ is a quantity of modulation symbols of a Rank Index (rank indication), a total quantity of modulation symbols in the subframe after multiplexing is $H''=H'+Q'_{RI}$, $c_{mux}=N_{symb}^{PUSCH}$ is defined as a quantity of columns of the channel interleaving matrix, indexes in the matrix are respectively 0, 1, 2, . . . , $C_{mux}-1$ in sequence from left to right, and $N_{symb}^{PUSCH}$ is a quantity of available symbols on a PUSCH channel in the subframe);

$Q'_{ACK}$ is a quantity of input ACK/NACK modulation symbols; $c_{ACK}$ is a column index in the channel interleaving matrix, that is, a location of a column at which the ACK/NACK information should be placed; $y_{r \times C_{mux}}+c_{ACK}$ is a modulation symbol at the $r^{th}$ row and the $c_{ACK}^{th}$ column in the channel interleaving matrix; and as shown in Table 5, ColumnSet(j) represents a column index at the $j^{th}$ column.

TABLE 5

| Column set for insertion of HARQ-ACK information (Column set for insertion of rank information) | |
|---|---|
| Cyclic prefix configuration | Column set |
| Standard | {2, 3, 8, 9} |
| Extension | {1, 2, 6, 7} |

Optionally, in another embodiment, Ue_id and UE_NUM may be represented based on Format 1A, or may be represented based on Format 2B/2C. This is not limited in this embodiment of the present invention.

Optionally, in another embodiment, Ue_id and UE_NUM may be 4 bits, or may be 8 bits. This is not limited in this embodiment of the present invention.

For example, according to a modification based on Format 1A, the indication information may be ACK/NACK group information, and the ACK/NACK group information may include UE_id (4 bits) and UE_NUM (4 bits).

Optionally, in another embodiment, the mapping resource indication information may include information about a start location of a subcarrier allocated to the terminal device and information about a quantity of subcarriers allocated to the terminal device.

For example, according to a modification based on Format 1A, the indication information may be an ACK/NACK resource, and the ACK/NACK resource may include start re_idx (11 bits) and total re_num (11 bits). start re_idx represents information about a start location of at least one subcarrier allocated to a target terminal device, and total re_num represents information about a quantity of subcarriers allocated to the target terminal device.

Optionally, in another embodiment, the method may further include the following: The terminal device may further send data, and the data is sent on a resource element other than resource elements allocated to the at least two terminal devices for sending HARQ information. During implementation, in a data mapping process, the terminal device may avoid the resource elements allocated to the at least two terminal devices for sending HARQ information, or directly puncture to delete data on the resource elements allocated to the at least two terminal devices for sending HARQ information.

It should be understood that, in this embodiment of the present invention, the network device may learn, according to scheduling information, a terminal device that needs to send uplink HARQ information in a current uplink subframe scheduling frequency band, and send the mapping resource indication information to the terminal device. The mapping resource indication information may include a quantity of pieces of HARQ information that need to be sent by the terminal device, and a quantity of pieces of HARQ information that need to be sent by another terminal device. Optionally, in another embodiment, the mapping resource indication information may further include an identification number (ID, Identity) of the terminal device. In this way, the terminal device may determine a time-frequency resource that needs to be cleared when encoding is performed at a current subframe.

Figure 6:
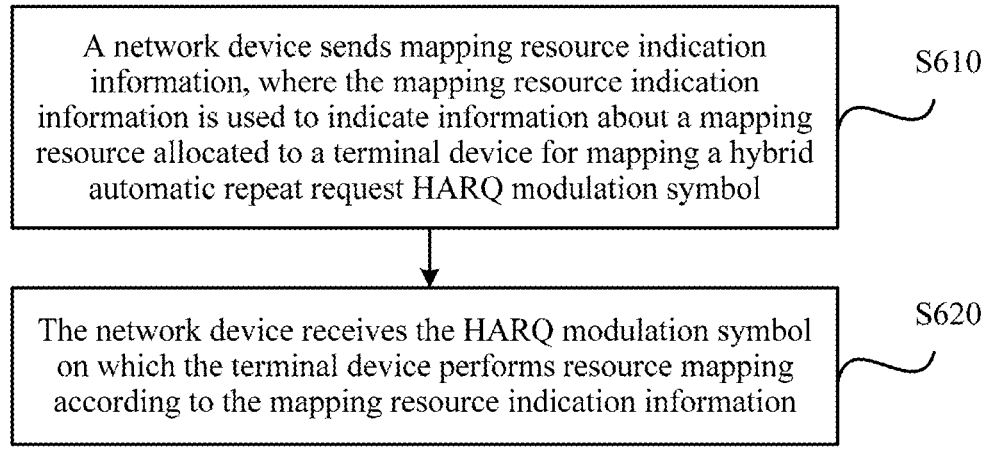
FIG. 6 is a schematic flowchart of an information transmission method according to still another embodiment of the present invention.

FIG. 6 is a schematic flowchart of an information transmission method according to still another embodiment of the present invention. The method shown in FIG. 6 may be executed by a network device, and the method 600 includes the following steps.

S610. The network device sends mapping resource indication information, where the mapping resource indication information is used to indicate information about a mapping resource allocated to a terminal device for mapping a hybrid automatic repeat request (HARQ) modulation symbol.

S620. The network device receives the HARQ modulation symbol on which the terminal device performed resource mapping according to the mapping resource indication information.

In this embodiment of the present invention, a manner of mapping encoded HARQ information is changed, and resource mapping is performed on a HARQ modulation symbol according to a resource indicated by indication information of a network device. Therefore, when multiple terminal devices transmit information by using a same time-frequency resource, the information can be mapped to different resources. Therefore, in this embodiment of the present invention, HARQ information can be transmitted in a system in which multiple terminal devices use a same time-frequency resource, thereby improving reliability of information transmission.

The method shown in FIG. 6 corresponds to the method shown in FIG. 5. To avoid repetition, details are not described herein.

Optionally, in another embodiment, the HARQ modulation symbol is mapped to one side or two sides of a modulation symbol of a demodulation reference signal (DMRS).

Optionally, in another embodiment, the mapping resource indication information includes identifiers of at least two terminal devices and a quantity of bits of to-be-sent HARQ information of each terminal device in the at least two terminal devices that is to send the HARQ information, the at least two terminal devices include the terminal device, and the at least two terminal devices transmit data by using a same time-frequency resource.

Optionally, in another embodiment, the mapping resource indication information includes information about a start location of a subcarrier allocated to each terminal device in at least two terminal devices for sending HARQ information, and a quantity of bits of to-be-sent HARQ information of each terminal device in the at least two terminal devices that is to send the HARQ information, the at least two terminal devices include the terminal device, and the at least two terminal devices transmit data by using a same time-frequency resource.

Optionally, in another embodiment, the mapping resource indication information includes identifiers of at least two terminal devices, information about a quantity of the at least two terminal devices, and a quantity of bits of a to-be-sent HARQ signal of each terminal device in the at least two terminal devices that is to send the HARQ information, the at least two terminal devices include the terminal device, and the at least two terminal devices transmit data by using a same time-frequency resource.

Optionally, in another embodiment, this embodiment of the present invention may further include: the terminal device sends data, where the sent data is sent on a resource element other than resource elements allocated to the at least two terminal devices for sending HARQ information.

Figure 7:
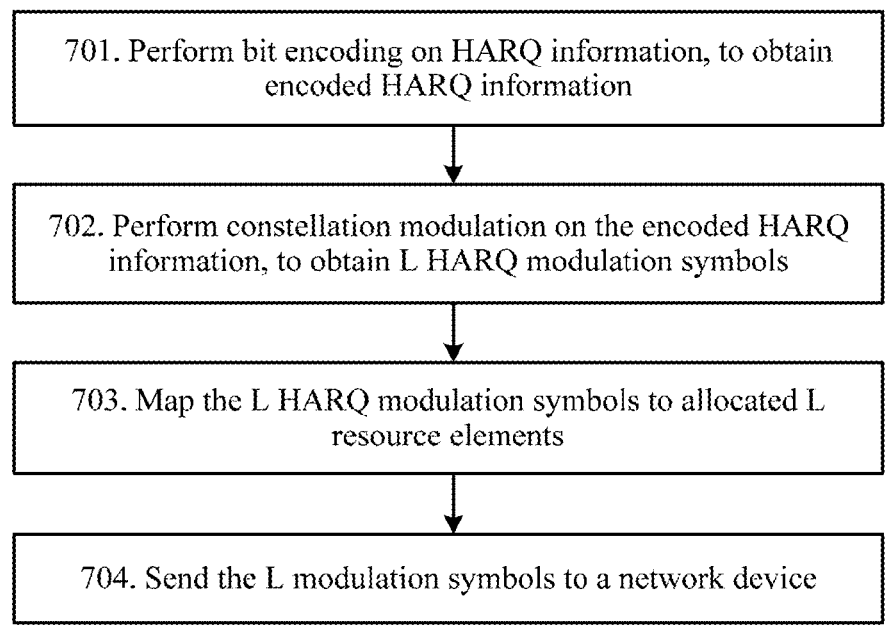
FIG. 7 is a schematic flowchart of an information transmission process according to an embodiment of the present invention.

FIG. 7 is a schematic flowchart of an information transmission process according to an embodiment of the present invention. The process shown in FIG. 7 may be executed by a terminal device. The process includes the following steps.

701. Perform bit encoding on HARQ information, to obtain encoded HARQ information.

When the HARQ information is transmitted on a PUSCH channel, the HARQ information first needs to be encoded. The HARQ information may include HARQ-ACK information and HARQ-NACK information.

Specifically, the HARQ-ACK information is used as an example. If bit encoding is performed on $Q_{ACK}$ pieces of HARQ-ACK information, $Q_{ACK}$ groups of encoded HARQ information $q_0^{ACK}, q_1^{ACK}, q_2^{ACK}, \ldots, q_{Q_{ACK}-1}^{ACK}$ are obtained. $q_i^{ACK} = (\tilde{q}_0, \ldots, \tilde{q}_{Q_m-1})$ is a group of the encoded HARQ information.

If a modulation order is K, a length of the encoded HARQ information is N×K, K is an integer multiple of 2, and N is a positive integer greater than 0.

For example, if the HARQ-ACK information includes 1 bit $[o_0^{ACK}]$, and the modulation order K is 2, the encoded HARQ-ACK information may be 2 bits $[o_0^{ACK}\ y]$, that is, N=1. If the modulation order K is 4, the encoded HARQ-ACK information may be 4 bits $[o_0^{ACK}\ y\ x\ x]$, that is, N=1. If the modulation order K is 6, the encoded HARQ-ACK information may be 6 bits $[o_0^{ACK}\ x\ x\ x\ x]$, that is, N=1.

If the HARQ-ACK information includes 2 bits $[o_1^{ACK}\ o_0^{ACK}]$, and the modulation order K is 2, the encoded HARQ-ACK information may be 6 bits $o_0^{ACK}\ o_1^{ACK}\ o_2^{ACK}\ o_0^{ACK}\ o_1^{ACK}\ o_2^{ACK}\ 1$, that is, N=3. If the modulation order K is 4, the encoded HARQ-ACK information obtained after the HARQ-ACK information is encoded may be 12 bits $[o_0^{ACK}\ o_1^{ACK}\ x\ x\ o_2^{ACK}\ o_0^{ACK}\ x\ x\ o_1^{ACK}\ o_2^{ACK}\ x\ x]$, that is, N=3. If the modulation order K is 6, the encoded HARQ-ACK information obtained after the HARQ-ACK information is encoded may be 18 bits $[o_0^{ACK}\ o_1^{ACK}\ x\ x\ x\ x\ o_2^{ACK}\ o_0^{ACK}\ x\ x\ x\ x\ o_1^{ACK}\ o_2^{ACK}\ x\ x\ x\ x]$, that is, N=3.

Optionally, in another embodiment, an encoding length of the encoded HARQ information may be increased in the bit encoding process. Specifically, if the HARQ information is 1 bit, the encoded HARQ information may be $q_i'^{ACK} = (\tilde{q}_0, \ldots, \tilde{q}_{N(Q_m-1)})$, and N is a positive integer. If the HARQ information is 2 bits, a bit of the HARQ information may be $q_i'^{ACK} = (\tilde{q}_0, \ldots, \tilde{q}_{3(Q_m-1)+2N})$, and N is a positive integer. By using repeated information bits, an encoding length is increased, encoding redundancy is increased, and a distance between HARQ-ACK information bits is widened, so that an error caused by encoding can be decreased.

It should be understood that, for a value of N in this embodiment of the present invention, different encoding lengths may be used according to a state of a channel environment. If the channel environment is good, fewer repetition times may be used. If the channel environment is poor, repetition times may be increased, to ensure reliability of HARQ-ACK information transmission.

For example, if the HARQ-ACK information includes 1 bit $[o_0^{ACK}]$, and the modulation order K is 2, the encoded HARQ-ACK information may be 4 bits $[o_0^{ACK}\ y\ o_0^{ACK}\ y]$, that is, N=2. If the modulation order K is 4, the encoded HARQ-ACK information may be 8 bits $[o_0^{ACK}\ y\ x\ x\ o_0^{ACK}\ y\ x\ x]$, N=2. If the modulation order K is 6, the HARQ-ACK information obtained after the HARQ-ACK information is encoded may be 12 bits $[o_0^{ACK}\ y\ x\ x\ x\ x\ o_0^{ACK}\ y\ x\ x\ x\ x]$, that is, N=2.

If the HARQ-ACK information includes 2 bits [$o_1^{ACK}$ $o_0^{ACK}$], and the modulation order K is 2, the encoded HARQ-ACK information obtained after the HARQ-ACK information is encoded may be 8 bits [$o_0^{ACK}$ $o_1^{ACK}$ $o_2^{ACK}$ $o_0^{ACK}$ $o_1^{ACK}$ $o_2^{ACK}$ $o_0^{ACK}$ $o_1^{ACK}$], that is, N=4. If the modulation order K is 4, the encoded HARQ-ACK information obtained after the HARQ-ACK information is encoded may be 16 bits [$o_0^{ACK}$ $o_1^{ACK}$ x x $o_2^{ACK}$ $o_0^{ACK}$ x x $o_1^{ACK}$ $o_2^{ACK}$ x x $o_0^{ACK}$ $o_1^{ACK}$ x x], that is, N=4. If the modulation order K is 6, the encoded HARQ-ACK information obtained after the HARQ-ACK information is encoded may be 24 bits [$o_0^{ACK}$ $o_1^{ACK}$ x x x x $o_2^{ACK}$ $o_0^{ACK}$ x x x x $o_1^{ACK}$ $o_2^{ACK}$ x x x x $o_0^{ACK}$ $o_1^{ACK}$ x x x x], that is, N=4.

If the HARQ-ACK information includes 2 bits [$o_1^{ACK}$ $o_0^{ACK}$], and the modulation order K is 2, the encoded HARQ-ACK information obtained after the HARQ-ACK information is encoded may be 12 bits [$o_0^{ACK}$ $o_1^{ACK}$ $o_2^{ACK}$ $o_0^{ACK}$ $o_1^{ACK}$ $o_2^{ACK}$ $o_0^{ACK}$ $o_1^{ACK}$ $o_2^{ACK}$ $o_0^{ACK}$ $o_1^{ACK}$ $o_2^{ACK}$], that is, N=6. If the modulation order K is 4, the encoded HARQ-ACK information obtained after the HARQ-ACK information is encoded may be 24 bits [$o_0^{ACK}$ $o_1^{ACK}$ x x $o_2^{ACK}$ $o_0^{ACK}$ x x $o_1^{ACK}$ $o_2^{ACK}$ x x $o_0^{ACK}$ $o_1^{ACK}$ x x $o_2^{ACK}$ $o_0^{ACK}$ x x $o_1^{ACK}$ $o_2^{ACK}$ x x], that is, N=6. If the modulation order K is 6, the encoded HARQ-ACK information obtained after the HARQ-ACK information is encoded may be 36 bits [$o_0^{ACK}$ $o_1^{ACK}$ x x x x $o_2^{ACK}$ $o_0^{ACK}$ x x x x $o_1^{ACK}$ $o_2^{ACK}$ x x x x $o_0^{ACK}$ $o_1^{ACK}$ x x x x $o_2^{ACK}$ $o_0^{ACK}$ x x x x $o_1^{ACK}$ $o_2^{ACK}$ x x x x], that is, N=6.

702. Perform constellation modulation on the encoded HARQ information, to obtain L HARQ modulation symbols.

$Q_{ACK}$ pieces of HARQ modulation information $X_0, X_1, \ldots, X_{Q_{ACK}-1}$ are obtained after modulation is performed on $Q_{ACK}$ groups of the encoded HARQ information $q_0^{ACK}, q_1^{ACK}, q_2^{ACK}, \ldots, q_{Q_{ACK}-1}^{ACK}$. $X_k = \{X_{k,1}, X_{k,1}, \ldots, X_{k,L}\}$ are the L HARQ modulation symbols obtained after modulation is performed according to a codebook $C_k$ of a user. The L HARQ modulation symbols correspond one-to-one to L resource elements.

703. Map the L HARQ modulation symbols to allocated L resource elements.

Specifically, different from an LTE system, one $X_k$ in the L HARQ modulation symbols is mapped each time, that is, the L HARQ modulation symbols are mapped to the corresponding L resource elements each time. It should be understood that the L resource elements resource elements may have a same time-domain location (that is, correspond to a same symbol) and have different frequency-domain locations (that is, correspond to different subcarriers). The mapping rule may be similar to a mapping rule in the LTE system, that is, mapping is started from the last L rows, and the L modulation symbols are sequentially mapped to four symbols on two sides of a DMRS, and are sequentially mapped to L resource elements of one symbol. If mapping of some HARQ modulation symbols is still not completed, mapping is performed on L rows sequentially added upwards, and mapping processing that is the same as that of the last L rows is performed, until mapping of all HARQ modulation symbols is completed.

704. Send the L modulation symbols to a network device.

In this embodiment of the present invention, encoded HARQ information is modulated according to a codebook, so that when multiple terminal devices transmit HARQ information by using a same time-frequency resource, correct decoding can be performed on a network device side. Therefore, in this embodiment of the present invention, HARQ information can be transmitted in a system in which multiple terminal devices use a same time-frequency resource, thereby improving reliability of information transmission.

Figure 8:
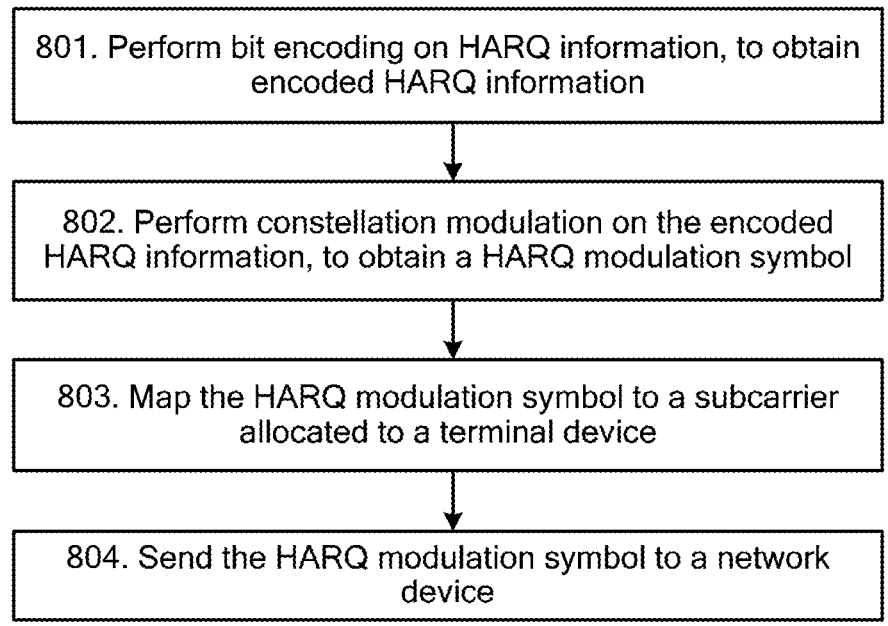
FIG. 8 is a schematic flowchart of an information transmission process according to another embodiment of the present invention.

FIG. 8 is a schematic flowchart of an information transmission process according to another embodiment of the present invention. The process shown in FIG. 8 may be executed by a terminal device, and the process includes the following steps.

801. Perform bit encoding on HARQ information, to obtain encoded HARQ information.

When the HARQ information is transmitted on a PUSCH channel, the HARQ information first needs to be encoded. The HARQ information may include HARQ-ACK information and HARQ-NACK information.

Specifically, the HARQ-ACK information is used as an example. If bit encoding is performed on $Q_{ACK}$ pieces of HARQ-ACK information, $Q_{ACK}$ groups of encoded HARQ information $q_0^{ACK}, q_1^{ACK}, q_2^{ACK}, \ldots, q_{Q_{ACK}-1}^{ACK}$ are obtained. $q_i^{ACK}=(\tilde{q}_0, \ldots, \tilde{q}_{Q_m-1})$ is a group of the encoded HARQ information.

If a modulation order is K, a length of the encoded HARQ information is N×K, K is an integer multiple of 2, and N is a positive integer greater than 0.

For example, if the HARQ-ACK information includes 1 bit [$o_0^{ACK}$], and the modulation order K is 2, the encoded HARQ-ACK information may be 2 bits [$o_0^{ACK}$ y], that is, N=1. If the modulation order K is 4, the encoded HARQ-ACK information may be 4 bits [$o_0^{ACK}$ y x x], that is, N=1. If the modulation order K is 6, the encoded HARQ-ACK information may be 6 bits [$o_0^{ACK}$ y x x x x], that is, N=1.

If the HARQ-ACK information includes 2 bits [$o_1^{ACK}$ $o_0^{ACK}$], and the modulation order K is 2, the encoded HARQ-ACK information may be 6 bits [$o_0^{ACK}$ $o_1^{ACK}$ $o_2^{ACK}$ $o_0^{ACK}$ $o_1^{ACK}$ $o_2^{ACK}$], that is, N=3. If the modulation order K is 4, the encoded HARQ-ACK information obtained after the HARQ-ACK information is encoded may be 12 bits [$o_0^{ACK}$ $o_1^{ACK}$ x x $o_2^{ACK}$ $o_0^{ACK}$ x x $o_1^{ACK}$ $o_2^{ACK}$ x x], that is, N=3. If the modulation order K is 6, the encoded HARQ-ACK information obtained after the HARQ-ACK information is encoded may be 18 bits [$o_0^{ACK}$ $o_1^{ACK}$ x x x x $o_2^{ACK}$ $o_0^{ACK}$ x x x x $o_1^{ACK}$ $o_2^{ACK}$ x x x x], N=3.

Optionally, in another embodiment, an encoding length of the encoded HARQ information may be increased in the bit encoding process. Specifically, if the HARQ information is 1 bit, the encoded HARQ information may be $q'_i{}^{ACK}=(\tilde{q}_0, \ldots, \tilde{q}_{N(Q_m-1)})$, and N is a positive integer. If the HARQ information is 2 bits, the encoded HARQ information may be $q'_i{}^{ACK}=(\tilde{q}_0, \ldots, \tilde{q}_{3(Q_m-1)+2N})$, and N is a positive integer. By using repeated information bits, an encoding length is increased, encoding redundancy is increased, and a distance between HARQ-ACK information bits is widened, so that an error caused by encoding can be decreased.

It should be understood that, for a value of N in this embodiment of the present invention, different encoding lengths may be used according to a state of a channel environment. If the channel environment is good, fewer repetition times may be used. If the channel environment is poor, repetition times may be increased, to ensure reliability of HARQ-ACK information transmission.

For example, if the HARQ-ACK information includes 1 bit [$o_0^{ACK}$], and the modulation order K is 2, the encoded HARQ-ACK information may be 4 bits [$o_0^{ACK}$ y $o_0^{ACK}$ y], that is, N=2. If the modulation order K is 4, the encoded HARQ-ACK information may be 8 bits [$o_0^{ACK}$ y x x $o_0^{ACK}$ y x x], that is, N=2. If the modulation order K is 6, the HARQ-ACK information obtained after the HARQ-ACK information is encoded may be 12 bits [$o_0^{ACK}$ y x x x x $o_0^{ACK}$ y x x x x], that is, N=2.

If the HARQ-ACK information includes 2 bits [$o_1^{ACK}$ $o_0^{ACK}$], and the modulation order K is 2, the encoded HARQ-ACK information obtained after the HARQ-ACK information is encoded may be 8 bits [$o_0^{ACK}$ $o_1^{ACK}$ $o_2^{ACK}$ $o_0^{ACK}$ $o_1^{ACK}$ $o_2^{ACK}$ $o_0^{ACK}$ $o_1^{ACK}$], that is, N=4. If the modulation order K is 4, the encoded HARQ-ACK information obtained after the HARQ-ACK information is encoded may be 16 bits [$o_0^{ACK}$ $o_1^{ACK}$ x x $o_2^{ACK}$ $o_0^{ACK}$ x x $o_1^{ACK}$ $o_2^{ACK}$ x x $o_0^{ACK}$ $o_1^{ACK}$ x x], that is, N=4. If the modulation order K is 6, the encoded HARQ-ACK information obtained after the HARQ-ACK information is encoded may be 24 bits [$o_0^{ACK}$ $o_1^{ACK}$ x x x x $o_2^{ACK}$ $o_0^{ACK}$ x x x x $o_1^{ACK}$ $o_2^{ACK}$ x x x x $o_0^{ACK}$ $o_1^{ACK}$ x x x x], that is, N=4.

If the HARQ-ACK information includes 2 bits [$o_1^{ACK}$ $o_0^{ACK}$], and the modulation order K is 2, the encoded HARQ-ACK information obtained after the HARQ-ACK information is encoded may be 12 bits [$o_0^{ACK}$ $o_1^{ACK}$ $o_2^{ACK}$ $o_0^{ACK}$ $o_1^{ACK}$ $o_2^{ACK}$ $o_0^{ACK}$ $o_1^{ACK}$ $o_2^{ACK}$ $o_0^{ACK}$ $o_1^{ACK}$ $o_2^{ACK}$], that is, N=6. If the modulation order K is 4, the encoded HARQ-ACK information obtained after the HARQ-ACK information is encoded may be 24 bits [$o_0^{ACK}$ $o_1^{ACK}$ x x $o_2^{ACK}$ $o_0^{ACK}$ x x $o_1^{ACK}$ $o_2^{ACK}$ x x $o_0^{ACK}$ $o_1^{ACK}$ x x $o_2^{ACK}$ $o_0^{ACK}$ x x $o_1^{ACK}$ $o_2^{ACK}$ x x], that is, N=6. If the modulation order K is 6, the encoded HARQ-ACK information obtained after the HARQ-ACK information is encoded may be 36 bits [$o_0^{ACK}$ $o_1^{ACK}$ x x x x $o_2^{ACK}$ $o_0^{ACK}$ x x x x $o_1^{ACK}$ $o_2^{ACK}$ x x x x $o_0^{ACK}$ $o_1^{ACK}$ x x x x $o_2^{ACK}$ $o_0^{ACK}$ x x x x $o_1^{ACK}$ $o_2^{ACK}$ x x x x], that is, N=6.

802. Perform constellation modulation on the encoded HARQ information, to obtain a HARQ modulation symbol.

If the HARQ information is 1 bit, one HARQ modulation symbol may be obtained after encoding and constellation modulation are performed on the HARQ information. If the HARQ information is 2 bits, three HARQ modulation symbols may be obtained after encoding and constellation modulation are performed on the HARQ information.

803. Map the HARQ modulation symbol to a subcarrier allocated to the terminal device.

It should be understood that subcarriers allocated to different terminal devices are different. That is, a fixed mapping location is allocated to each terminal device. In this way, HARQ modulation symbols of different terminal devices are not overlapped with each other, and correct decoding can be performed at the network device.

An example in which accessing of a maximum of six terminal devices is allowed in SCMA is used. Each color on two sides of a DMRS symbol represents a mapping location of a terminal device. The six terminal devices are sequentially arranged upwards from the last row, and one modulation symbol is mapped each time, until mapping of HARQ information of all terminal devices is completed.

Specifically, the step 803 in this embodiment of the present invention may be described with reference to FIG. 5. FIG. 5 shows an example in which accessing of a maximum of six terminal devices is allowed in SCMA. Fixed mark numbers on two sides of DMRS symbols represent mapping locations of a terminal device. For example, in a subcarrier corresponding to the last row, four resource elements whose mark numbers are 1 are allocated to a first terminal device. Similarly, in a subcarrier corresponding to the seventh row counted from the bottom, four resource elements whose mark numbers are 1 are also allocated to the first terminal device. In a subcarrier corresponding to the penultimate row, four resource elements whose mark numbers are 2 are allocated to a second terminal device. In a subcarrier corresponding to the eighth row counted from the bottom, four resource elements whose mark numbers are 2 are also allocated to the second terminal device. By analogy, resource elements whose mark numbers are 3, 4, 5, and 6 respectively correspond to a third terminal device, a fourth terminal device, a fifth terminal device, and a sixth terminal device. The six terminal devices are sequentially arranged upwards from the last row, and one modulation symbol is mapped each time, until mapping of HARQ information of all terminal devices is completed.

804. Send the HARQ modulation symbol to a network device.

In this embodiment of the present invention, a manner of mapping a HARQ information bit is changed, so that multiple terminal devices can respectively use different subcarriers when transmitting information by using a same time-frequency resource, so as to ensure correct decoding on a network device side. Therefore, in this embodiment of the present invention, HARQ information can be transmitted in a system in which multiple terminal devices use a same time-frequency resource, thereby improving reliability of information transmission.

Figure 9:
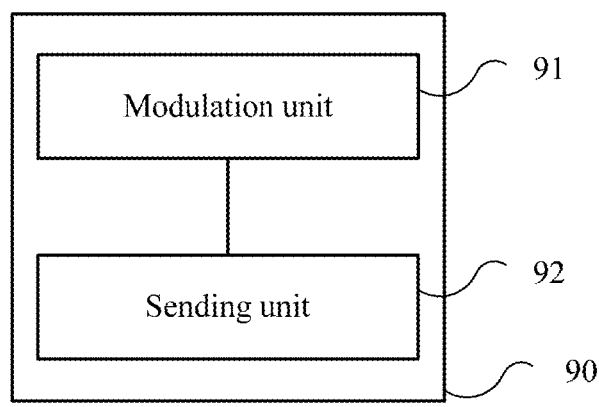
FIG. 9 is a schematic block diagram of a terminal device according to an embodiment of the present invention.

FIG. 9 is a schematic block diagram of a terminal device according to an embodiment of the present invention. The terminal device shown in FIG. 9 may implement the method and the process shown in FIG. 2 or FIG. 7. To avoid repetition, details are not described herein. The terminal device 90 includes:

a modulation unit 91, configured to modulate encoded hybrid automatic repeat request (HARQ) information according to a codebook, to generate HARQ modulation symbols, where the HARQ modulation symbols include at least one non-zero HARQ modulation symbol and at least one zero HARQ modulation symbol, the codebook includes at least two code words, the code words are multi-dimensional complex vectors, and the code words are used to indicate a mapping relationship between the encoded HARQ information and at least two modulation symbols; and a sending unit 92, configured to send the HARQ modulation symbols to a network device.

In this embodiment of the present invention, a manner of mapping a HARQ information bit is changed, so that when multiple terminal devices transmit information by using a same time-frequency resource, correct decoding can be performed on a network device side. Therefore, in this embodiment of the present invention, HARQ information can be transmitted in a system in which multiple terminal devices use a same time-frequency resource, thereby improving reliability of information transmission.

Optionally, in another embodiment, the HARQ modulation symbols generated by the modulation unit 91 in this embodiment of the present invention are mapped to one side or two sides of a modulation symbol of a demodulation reference signal (DMRS).

Optionally, in another embodiment, if a modulation order is K, a length of the encoded HARQ information is N×K, K is an integer multiple of 2, and N is a positive integer greater than 0.

Optionally, in another embodiment, if a length of HARQ information before encoding is 1 bit, N is equal to 2.

Optionally, in another embodiment, if a length of HARQ information before encoding is 2 bits, N is equal to 6.

Figure 10:
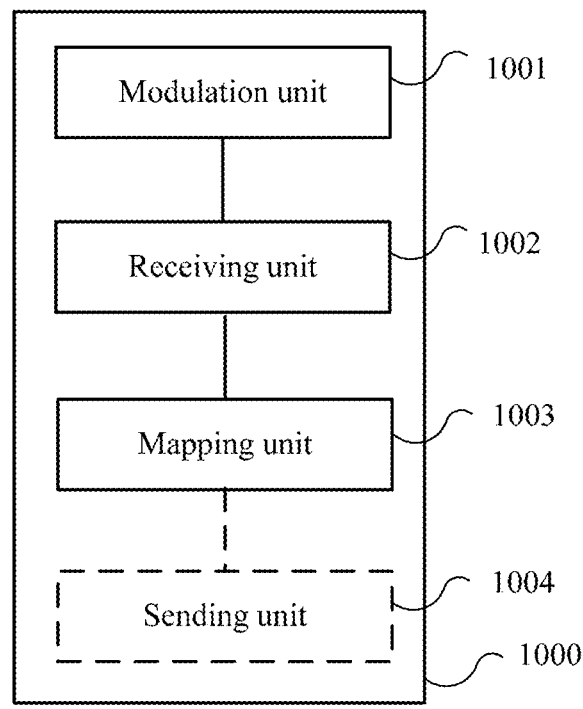
FIG. 10 is a schematic block diagram of a terminal device according to another embodiment of the present invention.

FIG. 10 is a schematic block diagram of a terminal device according to another embodiment of the present invention. The terminal device shown in FIG. 10 may implement the method and the process shown in FIG. 4 or FIG. 8. To avoid repetition, details are not described herein. The terminal device 1000 includes:

a modulation unit 1001, configured to modulate encoded hybrid automatic repeat request (HARQ) information, to generate a HARQ modulation symbol;

a receiving unit 1002, configured to receive mapping resource indication information, where the mapping resource indication information is used to indicate information about a mapping resource allocated to the terminal device for mapping the HARQ modulation symbol; and a mapping unit 1003, configured to perform resource mapping on the HARQ modulation symbol according to the mapping resource indication information.

In this embodiment of the present invention, a manner of mapping a HARQ information bit is changed, so that multiple terminal devices can respectively use different subcarriers when transmitting information by using a same time-frequency resource, so as to ensure correct decoding on a network device side. Therefore, in this embodiment of the present invention, HARQ information can be transmitted in a system in which multiple terminal devices use a same time-frequency resource, thereby improving reliability of information transmission.

Optionally, in another embodiment, the HARQ modulation symbol generated by the modulation unit is mapped to one side or two sides of a modulation symbol of a demodulation reference signal (DMRS).

Optionally, in another embodiment, the mapping resource indication information received by the receiving unit includes identifiers of at least two terminal devices and a quantity of bits of to-be-sent HARQ information of each terminal device in the at least two terminal devices that is to send the HARQ information, the at least two terminal devices include the terminal device, and the at least two terminal devices transmit data by using a same time-frequency resource.

Optionally, in another embodiment, the mapping resource indication information received by the receiving unit includes information about a start location of a subcarrier allocated to each terminal device in at least two terminal devices for sending HARQ information, and a quantity of bits of to-be-sent HARQ information of each terminal device in the at least two terminal devices that is to send the HARQ information, the at least two terminal devices include the terminal device, and the at least two terminal devices transmit data by using a same time-frequency resource.

Optionally, in another embodiment, the mapping resource indication information received by the receiving unit includes identifiers of at least two terminal devices, information about a quantity of the at least two terminal devices, and a quantity of bits of a to-be-sent HARQ signal of each terminal device in the at least two terminal devices that is to send the HARQ information, the at least two terminal devices include the terminal device, and the at least two terminal devices transmit data by using a same time-frequency resource.

Optionally, in another embodiment, the terminal device 1000 may further include:

a sending unit 1004, configured to send data, where the sent data is sent on a resource element other than resource elements allocated to the at least two terminal devices for sending HARQ information.

Figure 11:
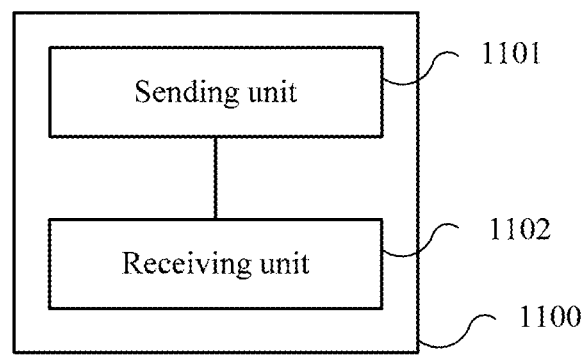
FIG. 11 is a schematic block diagram of a network device according to an embodiment of the present invention.

FIG. 11 is a schematic block diagram of a network device according to an embodiment of the present invention. The network device shown in FIG. 11 may implement the method shown in FIG. 6. To avoid repetition, details are not described herein. The network device 1100 includes:

a sending unit 1101, configured to send mapping resource indication information, where the mapping resource indication information is used to indicate information about a mapping resource allocated to a terminal device for mapping a hybrid automatic repeat request (HARQ) modulation symbol; and a receiving unit 1102, configured to receive the HARQ modulation symbol on which the terminal device performed resource mapping according to the mapping resource indication information.

Optionally, in another embodiment, the HARQ modulation symbol is mapped to one side or two sides of a modulation symbol of a demodulation reference signal (DMRS).

Optionally, in another embodiment, the mapping resource indication information sent by the sending unit includes identifiers of at least two terminal devices and a quantity of bits of to-be-sent HARQ information of each terminal device in the at least two terminal devices that is to send the HARQ information, the at least two terminal devices include the terminal device, and the at least two terminal devices transmit data by using a same time-frequency resource.

Optionally, in another embodiment, the mapping resource indication information sent by the sending unit includes information about a start location of a subcarrier allocated to each terminal device in at least two terminal devices for sending HARQ information, and a quantity of bits of to-be-sent HARQ information of each terminal device in the at least two terminal devices that is to send the HARQ information, the at least two terminal devices include the terminal device, and the at least two terminal devices transmit data by using a same time-frequency resource.

Optionally, in another embodiment, the mapping resource indication information sent by the sending unit includes identifiers of at least two terminal devices, information about a quantity of the at least two terminal devices, and a quantity of bits of a to-be-sent HARQ signal of each terminal device in the at least two terminal devices that is to send the HARQ information, the at least two terminal devices include the terminal device, and the at least two terminal devices transmit data by using a same time-frequency resource.

Optionally, in another embodiment, the receiving unit 1102 is further configured to receive data sent by the terminal device, where the sent data is sent on a resource element other than resource elements allocated to the at least two terminal devices for sending HARQ information.

Figure 12:
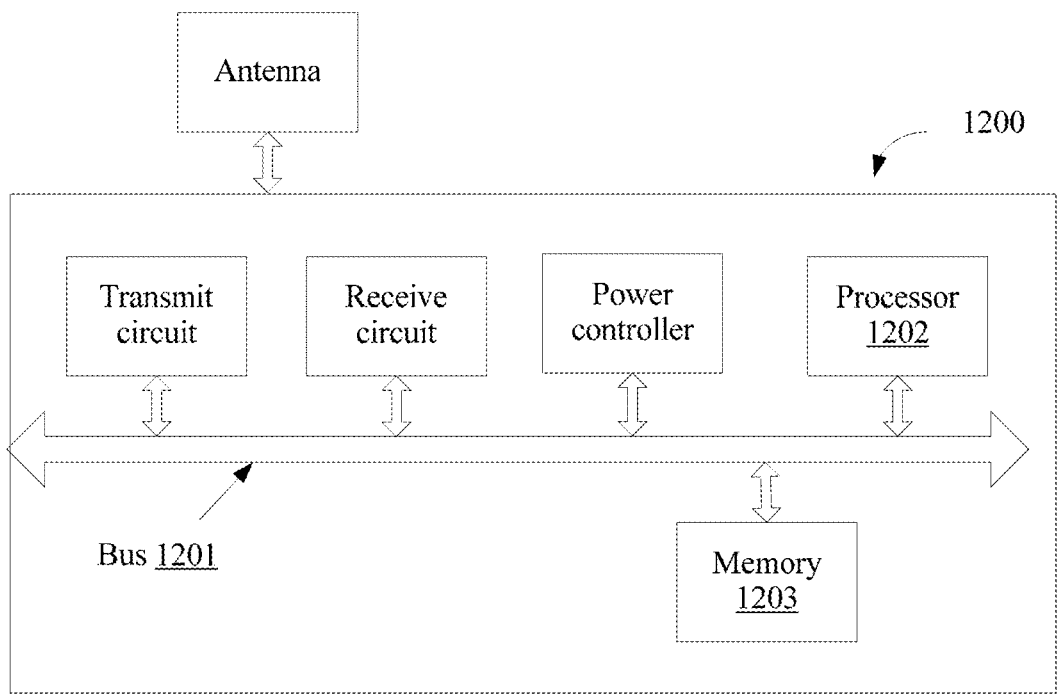
FIG. 12 is a schematic block diagram of an apparatus according to an embodiment of the present invention.

FIG. 12 is a schematic block diagram of an apparatus according to an embodiment of the present invention. As shown in FIG. 12, the apparatus 1200 includes:

a bus 1201;

a processor 1202 connected to the bus; and a memory 1203 connected to the bus; where the processor invokes, by using the bus, a program stored in the memory, to modulate encoded hybrid automatic repeat request (HARQ) information according to a codebook, to generate HARQ modulation symbols, where the HARQ modulation symbols include at least one non-zero HARQ modulation symbol and at least one zero HARQ modulation symbol, the codebook includes at least two code words, the code words are multi-dimensional complex vectors, and the code words are used to indicate a mapping relationship between the encoded HARQ information and at least two modulation symbols; and to send the HARQ modulation symbols to a network device.

Optionally, in another embodiment, the HARQ modulation symbols are mapped to one side or two sides of a modulation symbol of a demodulation reference signal (DMRS).

Optionally, in another embodiment, if a modulation order is K, a length of the encoded HARQ information is N×K, K is an integer multiple of 2, and N is a positive integer greater than 0.

Optionally, in another embodiment, if a length of HARQ information before encoding is 1 bit, N is equal to 2.

Optionally, in another embodiment, if a length of HARQ information before encoding is 2 bits, N is equal to 6.

A receiver of the apparatus 1200 may include a receive circuit, a power controller, and an antenna. In addition, the apparatus 1200 may further include a transmitter, and the transmitter may include a transmit circuit, a power controller, and an antenna.

The processor may also be referred to as a CPU. The memory may include a read-only memory and a random access memory, and provide an instruction and data for the processor. A part of the memory may further include a nonvolatile random access memory (NVRAM). In specific application, the apparatus 1200 may be built in a wireless communications device such as a mobile phone or a network device such as a network-side device, or the apparatus 1200 itself may be a wireless communications device such as a mobile phone or a network device such as a network-side device, and the apparatus 1200 may further include a carrier that accommodates the transmit circuit and the receive circuit, so as to allow data transmitting and receiving between the apparatus 1200 and a remote location. The transmit circuit and the receive circuit may be coupled to the antenna. All components of the apparatus 1200 are coupled together by using the bus. In addition to a data bus, the bus further includes a power bus, a control bus, and a status signal bus. However, for clarity of description, various buses are marked as the bus 1201 in the figure. Specific components that are configured to implement various functions in different products may be integrated with the processing unit.

The processor can implement or execute steps and logical block diagrams that are disclosed in method embodiments of the present invention. The general-purpose processor may be a microprocessor, or the processor may be any conventional processor. The steps of the method disclosed with reference to this embodiment of the present invention may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically-erasable programmable memory, or a register.

It should be understood that, in this embodiment of the present invention, the processor 1202 may be a central processing unit (CPU), or the processor 1202 may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

The memory 1203 may include a read-only memory and a random access memory, and provide an instruction and data for the processor 1202. A part of the memory 1203 may further include a nonvolatile random access memory. For example, the memory 1203 may further store information about a device type.

In addition to a data bus, the bus system may further include a power bus, a control bus, a status signal bus, and the like. However, for clear description, various buses are marked as the bus system in the figure.

In an implementation process, the steps in the foregoing method may be performed by using an integrated logic circuit of hardware in the processor 1202 or an instruction in a form of software. The steps of the method disclosed with reference to this embodiment of the present invention may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically-erasable programmable memory, or a register. The storage medium is located in the memory 1203. The processor 1202 reads information in the memory 1203, and completes the steps of the foregoing method in combination with hardware in the processor 1202. To avoid repetition, details are not repeatedly described herein.

In this embodiment of the present invention, a manner of mapping a HARQ information bit is changed, so that when multiple terminal devices transmit information by using a same time-frequency resource, correct decoding can be performed on a network device side. Therefore, in this embodiment of the present invention, HARQ information can be transmitted in a system in which multiple terminal devices use a same time-frequency resource, thereby improving reliability of information transmission.

Figure 13:
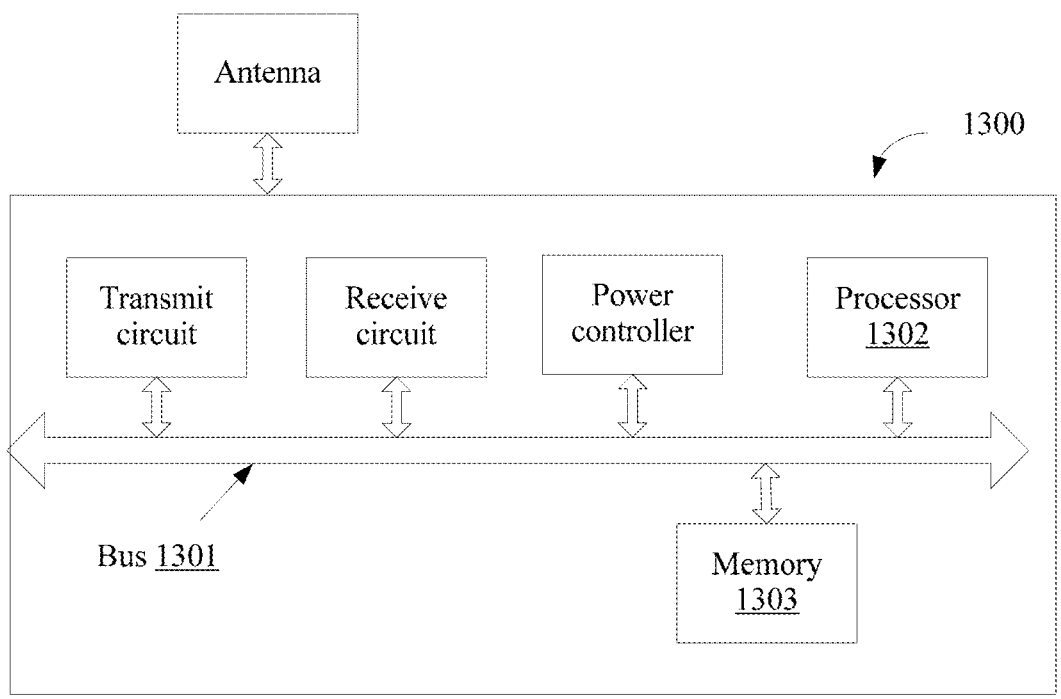
FIG. 13 is a schematic block diagram of an apparatus according to another embodiment of the present invention.

FIG. 13 is a schematic block diagram of an apparatus according to another embodiment of the present invention. As shown in FIG. 13, the apparatus 1300 includes:

a bus 1301;

a processor 1302 connected to the bus; and a memory 1303 connected to the bus; where the processor invokes, by using the bus, a program stored in the memory, to modulate encoded hybrid automatic repeat request (HARQ) information, to generate a HARQ modulation symbol;

to receive mapping resource indication information, where the mapping resource indication information is used to indicate information about a mapping resource allocated to the terminal device for mapping the HARQ modulation symbol; and to perform resource mapping on the HARQ modulation symbol according to the mapping resource indication information.

Optionally, in another embodiment, the HARQ modulation symbol is mapped to one side or two sides of a modulation symbol of a demodulation reference signal (DMRS).

Optionally, in another embodiment, the mapping resource indication information includes identifiers of at least two terminal devices and a quantity of bits of to-be-sent HARQ information of each terminal device in the at least two terminal devices that is to send the HARQ information, the at least two terminal devices include the terminal device, and the at least two terminal devices transmit data by using a same time-frequency resource.

Optionally, in another embodiment, the mapping resource indication information includes information about a start location of a subcarrier allocated to each terminal device in at least two terminal devices for sending HARQ information, and a quantity of bits of to-be-sent HARQ information of each terminal device in the at least two terminal devices that is to send the HARQ information, the at least two terminal devices include the terminal device, and the at least two terminal devices transmit data by using a same time-frequency resource.

Optionally, in another embodiment, the mapping resource indication information includes identifiers of at least two terminal devices, information about a quantity of the at least two terminal devices, and a quantity of bits of a to-be-sent HARQ signal of each terminal device in the at least two terminal devices that is to send the HARQ information, the at least two terminal devices include the terminal device, and the at least two terminal devices transmit data by using a same time-frequency resource.

Optionally, in another embodiment, the processor may be further configured to send data, where the sent data is sent on a resource element other than resource elements allocated to the at least two terminal devices for sending HARQ information.

A receiver of the apparatus 1300 may include a receive circuit, a power controller, and an antenna. In addition, the apparatus 1300 may further include a transmitter, and the transmitter may include a transmit circuit, a power controller, and an antenna.

The processor may also be referred to as a CPU. The memory may include a read-only memory and a random access memory, and provide an instruction and data for the processor. A part of the memory may further include a nonvolatile random access memory (NVRAM). In specific application, the apparatus 1300 may be built in a wireless communications device such as a mobile phone or a network device such as a network-side device, or the apparatus 1300 itself may be a wireless communications device such as a mobile phone or a network device such as a network-side device, and the apparatus 1300 may further include a carrier that accommodates the transmit circuit and the receive circuit, so as to allow data transmitting and receiving between the apparatus 1300 and a remote location. The transmit circuit and the receive circuit may be coupled to the antenna. All components of the apparatus 1300 are coupled together by using the bus. In addition to a data bus, the bus further includes a power bus, a control bus, and a status signal bus. However, for clarity of description, various buses are marked as the bus 1301 in the figure. Specific components that are configured to implement various functions in different products may be integrated with the processing unit.

The processor can implement or execute steps and logical block diagrams that are disclosed in method embodiments of the present invention. The general-purpose processor may be a microprocessor, or the processor may be any conventional processor, decoder, or the like. The steps of the method disclosed with reference to this embodiment of the present invention may be directly performed by a hardware processor, or may be performed by using a combination of hardware in a decoding processor and a software module. The software module may be located in a mature storage medium in the art, such as a random access memory, a flash memory, a read-only memory, a programmable read-only memory, an electrically-erasable programmable memory, or a register.

It should be understood that, in this embodiment of the present invention, the processor 1302 may be a central processing unit (CPU), or the processor 1302 may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

The memory 1303 may include a read-only memory and a random access memory, and provide an instruction and data for the processor 1302. A part of the memory 1303 may further include a nonvolatile random access memory. For example, the memory 1303 may further store information about a device type.

In addition to a data bus, the bus system may further include a power bus, a control bus, a status signal bus, and the like. However, for clear description, various buses are marked as the bus system in the figure.

In an implementation process, the steps in the foregoing method may be performed by using an integrated logic circuit of hardware in the processor 1302 or an instruction in a form of software. The steps of the method disclosed with reference to this embodiment of the present invention may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically-erasable programmable memory, or a register. The storage medium is located in the memory 1303. The processor 1302 reads information in the memory 1303, and completes the steps of the foregoing method in combination with hardware in the processor 1302. To avoid repetition, details are not repeatedly described herein.

In this embodiment of the present invention, a manner of mapping a HARQ information bit is changed, so that multiple terminal devices can respectively use different subcarriers when transmitting information by using a same time-frequency resource, so as to ensure correct decoding on a network device side. Therefore, in this embodiment of the present invention, HARQ information can be transmitted in a system in which multiple terminal devices use a same time-frequency resource, thereby improving reliability of information transmission.

Figure 14:
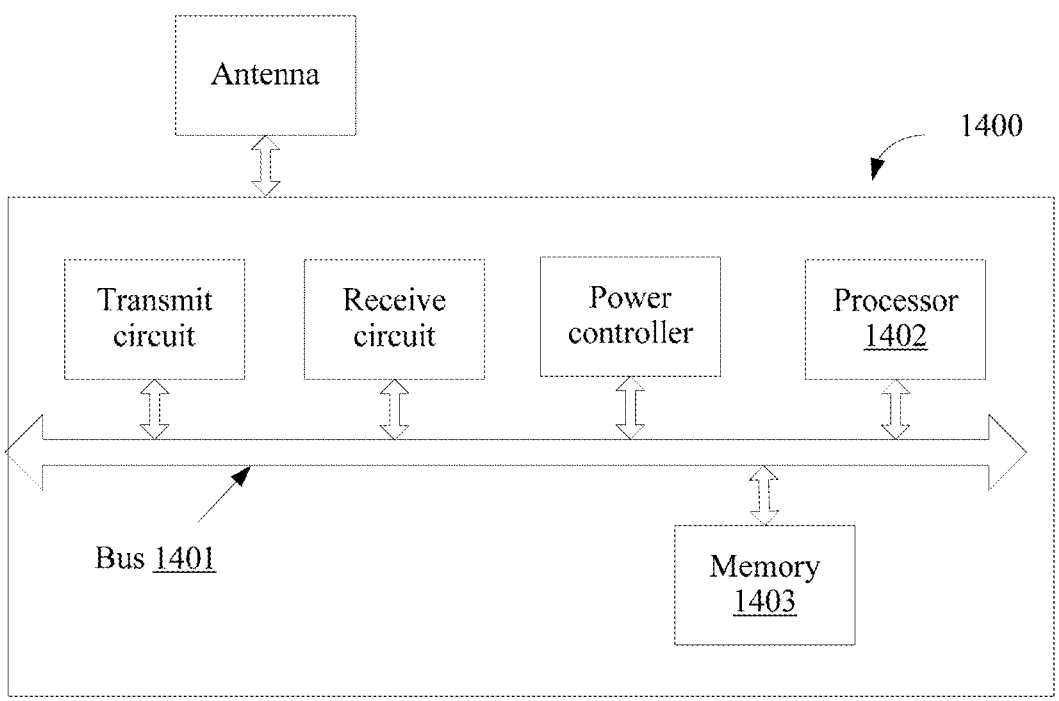
FIG. 14 is a schematic block diagram of an apparatus according to still another embodiment of the present invention.

FIG. 14 is a schematic block diagram of an apparatus according to still another embodiment of the present invention. As shown in FIG. 14, the apparatus 1400 includes:

a bus 1401;

a processor 1402 connected to the bus; and a memory 1403 connected to the bus; where the processor invokes, by using the bus, a program stored in the memory, to send mapping resource indication information, where the mapping resource indication information is used to indicate information about a mapping resource allocated to a terminal device for mapping a hybrid automatic repeat request (HARQ) modulation symbol; and to receive the HARQ modulation symbol on which the terminal device performed resource mapping according to the mapping resource indication information.

Optionally, in another embodiment, the HARQ modulation symbol is mapped to one side or two sides of a modulation symbol of a demodulation reference signal (DMRS).

Optionally, in another embodiment, the mapping resource indication information includes identifiers of at least two terminal devices and a quantity of bits of to-be-sent HARQ information of each terminal device in the at least two terminal devices that is to send the HARQ information, the at least two terminal devices include the terminal device, and the at least two terminal devices transmit data by using a same time-frequency resource.

Optionally, in another embodiment, the mapping resource indication information includes information about a start location of a subcarrier allocated to each terminal device in at least two terminal devices for sending HARQ information, and a quantity of bits of to-be-sent HARQ information of each terminal device in the at least two terminal devices that is to send the HARQ information, the at least two terminal devices include the terminal device, and the at least two terminal devices transmit data by using a same time-frequency resource.

Optionally, in another embodiment, the mapping resource indication information includes identifiers of at least two terminal devices, information about a quantity of the at least two terminal devices, and a quantity of bits of a to-be-sent HARQ signal of each terminal device in the at least two terminal devices that is to send the HARQ information, the at least two terminal devices include the terminal device, and the at least two terminal devices transmit data by using a same time-frequency resource.

Optionally, in another embodiment, the processor may be further configured to receive data sent by the terminal device, where the sent data is sent on a resource element other than resource elements allocated to the at least two terminal devices for sending HARQ information.

A receiver of the apparatus 1400 may include a receive circuit, a power controller, and an antenna. In addition, the apparatus 1400 may further include a transmitter, and the transmitter may include a transmit circuit, a power controller, and an antenna.

The processor may also be referred to as a CPU. The memory may include a read-only memory and a random access memory, and provide an instruction and data for the processor. A part of the memory may further include a nonvolatile random access memory (NVRAM). In specific application, the apparatus 1400 may be built in a wireless communications device such as a mobile phone or a network device such as a network-side device, or the apparatus 1400 itself may be a wireless communications device such as a mobile phone or a network device such as a network-side device, and the apparatus 1400 may further include a carrier that accommodates the transmit circuit and the receive circuit, so as to allow data transmitting and receiving between the apparatus 1400 and a remote location. The transmit circuit and the receive circuit may be coupled to the antenna. All components of the apparatus 1400 are coupled together by using the bus. In addition to a data bus, the bus further includes a power bus, a control bus, and a status signal bus. However, for clarity of description, various buses are marked as the bus 1401 in the figure. Specific components that are configured to implement various functions in different products may be integrated with the processing unit.

The processor can implement or execute steps and logical block diagrams that are disclosed in method embodiments of the present invention. The general-purpose processor may be a microprocessor, or the processor may be any conventional processor, decoder, or the like. The steps of the method disclosed with reference to this embodiment of the present invention may be directly performed by a hardware processor, or may be performed by using a combination of hardware in a decoding processor and a software module. The software module may be located in a mature storage medium in the art, such as a random access memory, a flash memory, a read-only memory, a programmable read-only memory, an electrically-erasable programmable memory, or a register.

It should be understood that, in this embodiment of the present invention, the processor 1402 may be a central processing unit (CPU), or the processor 1402 may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

The memory 1403 may include a read-only memory and a random access memory, and provide an instruction and data for the processor 1402. A part of the memory 1403 may further include a nonvolatile random access memory. For example, the memory 1403 may further store information about a device type.

In addition to a data bus, the bus system may further include a power bus, a control bus, a status signal bus, and the like. However, for clear description, various buses are marked as the bus system in the figure.

In an implementation process, the steps in the foregoing method may be performed by using an integrated logic circuit of hardware in the processor 1402 or an instruction in a form of software. The steps of the method disclosed with reference to this embodiment of the present invention may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically-erasable programmable memory, or a register. The storage medium is located in the memory 1403. The processor 1402 reads information in the memory 1403, and completes the steps of the foregoing method in combination with hardware in the processor 1402. To avoid repetition, details are not repeatedly described herein.

In this embodiment of the present invention, a manner of mapping a HARQ information bit is changed, so that multiple terminal devices can respectively use different subcarriers when transmitting information by using a same time-frequency resource, so as to ensure correct decoding on a network device side. Therefore, in this embodiment of the present invention, HARQ information can be transmitted in a system in which multiple terminal devices use a same time-frequency resource, thereby improving reliability of information transmission.

Technical characteristics in the foregoing embodiments may be applicable to each other. For example, for clarity and conciseness of the specification, it may be understood that a technical characteristic and description in an embodiment are also applicable to another embodiment, and details are not repeatedly described in another embodiment.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present invention, "B corresponding to A" indicates that B is associated with A and that B may be determined according to A. However, it should further be understood that determining B according to A does not mean that B is determined according to A only; that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a random access memory (RAM), a read-only memory (ROM), an electrically erasable programmable read-only memory (EEPROM), a Compact Disc-Read Only Memory (CD-ROM), or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in definition of a medium to which they belong. For example, a disk and disc used by the present invention includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In conclusion, what is described above is merely an example of embodiments of the technical solutions of the present invention, but is not intended to limit the protection scope of the present invention. Any modification, equivalent replacement, or improvement made without departing from the principle of the present invention shall fall within the protection scope of the present invention. Additionally, statements made herein characterizing the invention refer to an embodiment of the invention and not necessarily all embodiments.

What is claimed is:

1. A hybrid automatic repeat request (HARQ) information transmission method, comprising:
receiving, by a terminal device of at least two terminal devices, mapping resource indication information, wherein the mapping resource indication information indicates information about a mapping resource allocated to the terminal device for mapping HARQ modulation symbols, wherein the at least two terminal devices transmit information by using a same time-frequency resource, wherein the mapping resource allocated to the terminal device indicates resource elements (REs) in the same time-frequency resource, and wherein the mapping resource allocated to the terminal device is different from a mapping resource allocated to another terminal device of the at least two terminal devices;
modulating, by the terminal device, encoded HARQ information according to a codebook to generate the HARQ modulation symbols, wherein the HARQ modulation symbols comprise at least one non-zero HARQ modulation symbol and at least one zero HARQ modulation symbol, wherein the at least one non-zero HARQ modulation symbol corresponds to at least one non-zero element, and the at least one non-zero element indicates that elements of code words in a corresponding codebook are not all zero, wherein the at least one zero HARQ modulation symbol corresponds to at least one zero element, and the at least one zero element indicates that elements of code words in a corresponding codebook are zero, wherein the codebook comprises at least two code words, wherein the code words are multi-dimensional complex vectors, and wherein the code words used to indicate a mapping relationship between the encoded HARQ information and at least two modulation symbols;

performing, by the terminal device, resource mapping on the HARQ modulation symbols according to the mapping resource indication information; and sending, by the terminal device, the HARQ modulation symbols to a network device.

2. The method according to claim 1, wherein the HARQ modulation symbols are mapped to one side or two sides of a modulation symbol of a demodulation reference signal (DMRS).

3. A hybrid automatic repeat request (HARQ) information transmission method, comprising:

sending, by a network device, mapping resource indication information, wherein the mapping resource indication information indicates information about a mapping resource allocated to a terminal device of at least two terminal devices for mapping HARQ modulation symbols, wherein the at least two terminal devices transmit information by using a same time-frequency resource, wherein the mapping resource allocated to the terminal device indicates resource elements (REs) in the same time-frequency resource, and wherein the mapping resource allocated to the terminal device is different from a mapping resource allocated to another terminal device of the at least two terminal devices; and receiving, by the network device, the HARQ modulation symbols on which the terminal device performed resource mapping according to the mapping resource indication information.

4. The method according to claim 3, wherein the HARQ modulation symbols are mapped to one side or two sides of a modulation symbol of a demodulation reference signal (DMRS).

5. The method according to claim 3, wherein the mapping resource indication information comprises identifiers of the at least two terminal devices and a quantity of bits of to-be-sent HARQ information of each terminal device of the at least two terminal devices.

6. The method according to claim 3, wherein the mapping resource indication information comprises information about a start location of a subcarrier allocated to each terminal device of the at least two terminal devices and a quantity of bits of to-be-sent HARQ information of each terminal device of the at least two terminal devices.

7. The method according to claim 3, wherein the mapping resource indication information comprises identifiers of the at least two terminal devices, information about a quantity of the at least two terminal devices, and a quantity of bits of a to-be-sent HARQ signal of each terminal device of the at least two terminal devices.

8. A terminal device, comprising a processor and a non-transitory memory having instructions stored thereon, wherein the instructions, when executed by the processor, facilitate:

receiving, by the terminal device, mapping resource indication information, wherein the mapping resource indication information indicates information about a mapping resource allocated to the terminal device for mapping hybrid automatic repeat request (HARQ) modulation symbols, wherein the terminal device is one of at least two terminal devices, wherein the at least two terminal devices transmit information by using a same time-frequency resource, wherein the mapping resource allocated to the terminal device indicates resource elements (REs) in the same time-frequency resource, and wherein the mapping resource allocated to the terminal device is different from a mapping resource allocated to another terminal device of the at least two terminal devices;

modulating, by the terminal device, encoded HARQ information according to a codebook to generate the HARQ modulation symbols, wherein the HARQ modulation symbols comprise at least one non-zero HARQ modulation symbol and at least one zero HARQ modulation symbol, wherein the at least one non-zero HARQ modulation symbol corresponds to at least one non-zero element, and the at least one non-zero element indicates that elements of code words in a corresponding codebook are not all zero, wherein the at least one zero HARQ modulation symbol corresponds to at least one zero element, and the at least one zero element indicates that elements of code words in a corresponding codebook are zero, wherein the codebook comprises at least two code words, wherein the code words are multi-dimensional complex vectors, and wherein the code words indicate a mapping relationship between the encoded HARQ information and at least two modulation symbols;

performing, by the terminal device, resource mapping on the HARQ modulation symbols according to the mapping resource indication information; and sending, by the terminal device, the HARQ modulation symbols to a network device.

9. The terminal device according to claim 8, wherein the HARQ modulation symbols are mapped to one side or two sides of a modulation symbol of a demodulation reference signal (DMRS).

10. A network device, comprising a processor and a non-transitory memory having instructions stored thereon, wherein the instructions, when executed by the processor, facilitate:

sending, by the network device, mapping resource indication information, wherein the mapping resource indication information indicates information about a mapping resource allocated to a terminal device of at least two terminal devices for mapping hybrid automatic repeat request (HARQ) modulation symbols, wherein the at least two terminal devices transmit information by using a same time-frequency resource, wherein the mapping resource allocated to the terminal device indicates resource elements (REs) in the same time-frequency resource, and wherein the mapping resource allocated to the terminal device is different from a mapping resource allocated to another terminal device of the at least two terminal devices; and receiving, by the network device, the HARQ modulation symbols on which the terminal device performed resource mapping according to the mapping resource indication information.

11. The network device according to claim 10, wherein the HARQ modulation symbols are mapped to one side or two sides of a modulation symbol of a demodulation reference signal (DMRS).

12. The network device according to claim 10, wherein the mapping resource indication information comprises identifiers of the at least two terminal devices and a quantity of bits of to-be-sent HARQ information of each terminal device of the at least two terminal devices.

13. The network device according to claim 10, wherein the mapping resource indication information comprises information about a start location of a subcarrier allocated to each terminal device of the at least two terminal devices and a quantity of bits of to-be-sent HARQ information of each terminal device of the at least two terminal devices.

14. The network device according to claim 10, wherein the mapping resource indication information comprises identifiers of the at least two terminal devices, information about a quantity of the at least two terminal devices, and a quantity of bits of a to-be-sent HARQ signal of each terminal device of the at least two terminal devices.

\* \* \* \* \*